(12) United States Patent
Tomita

(10) Patent No.: US 6,889,111 B2
(45) Date of Patent: May 3, 2005

(54) SEWING PATTERN SUPPLY SYSTEM

(75) Inventor: Shintaro Tomita, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/473,321

(22) PCT Filed: Mar. 20, 2002

(86) PCT No.: PCT/JP02/02680
§ 371 (c)(1),
(2), (4) Date: Sep. 29, 2003

(87) PCT Pub. No.: WO02/081803
PCT Pub. Date: Oct. 17, 2002

(65) Prior Publication Data
US 2004/0133296 A1 Jul. 8, 2004

(30) Foreign Application Priority Data
Mar. 30, 2001 (JP) .................. 2001-100113
Mar. 30, 2001 (JP) .................. 2001-100114

(51) Int. Cl.[7] ............ G06F 19/00; D05C 5/02
(52) U.S. Cl. ............ 700/138; 112/102.5; 112/112; 112/470.04; 705/26
(58) Field of Search ............ 700/137, 138; 112/102.5, 470.06, 475.19, 155; 705/1, 26

(56) References Cited

U.S. PATENT DOCUMENTS 5,970,894 A  10/1999  Mase
6,196,146 B1  3/2001  Goldberg et al.
6,216,618 B1 *  4/2001  Goldberg et al. ...... 112/470.04
6,631,306 B2 * 10/2003  Funahashi et al. ........ 700/138

FOREIGN PATENT DOCUMENTS

| EP | 0 809 221 A2 | 11/1997 |
|---|---|---|
| EP | 0 823 820 A2 | 2/1998 |
| JP | A 11-66182 | 3/1999 |
| JP | A 11-76663 | 3/1999 |
| JP | A 2000-197781 | 7/2000 |
| JP | A 2000-242604 | 9/2000 |

* cited by examiner

Primary Examiner—Peter Nerbun
(74) Attorney, Agent, or Firm—Oliff & Berridge, PLC

(57) ABSTRACT

Type information on sewing machine types and identification information for specifying a sewing machine are stored in a control unit and computer of the sewing machine. A server transmits display data for displaying a pattern selection edit screen to the sewing machine side. At the sewing machine side, a pattern is selected while the pattern selection edit screen is being viewed, and an edit processing is instructed. The server edits an embroidery pattern ordered at the sewing machine side, based on the instruction supplied from the sewing machine side. The server transmits the display data and sewing pattern data to the sewing machine side. Incorporated patterns and non-incorporated patterns at the sewing machine side are displayed identifiably on a display at the sewing machine side. The server charges for the non-incorporated newly purchased patterns.

28 Claims, 16 Drawing Sheets

CONTENTS STORED IN ROM 22 OF SEWING MACHINE CONTROL UNIT (1) NORMAL SEWING CONTROL PROGRAM
(2) EMBROIDERY SEWING CONTROL PROGRAM
(3) EQUIPMENT CONTROL PROGRAM
(4) DISPLAY CONTROL PROGRAM
(5) COMMUNICATION CONTROL PROGRAM
(6) PATTERN DATA OF INCORPORATED EMBROIDERY PATTERN
(7) SEWING MACHINE TYPE INFORMATION AND SEWING AREA SIZE INFORMATION

FIG. 8

CONTENTS STORED IN ROM 42 OF COMPUTER (1) EQUIPMENT CONTROL PROGRAM
(2) DISPLAY CONTROL PROGRAM
(3) COMMUNICATION CONTROL PROGRAM

FIG. 9

CONTENTS STORED IN HARD DISK OF COMPUTER (1) COMMUNICATION CONTROL PROGRAM COMMUNICATION WITH PUBLIC COMMUNICATION NETWORK
(2) FOLDERS AND CONTROL PROGRAM THEREFOR
(3) PATTERN DATA OF INCORPORATED EMBROIDERY PATTERN
(4) PATTERN DATA OF PREVIOUSLY PURCHASED EMBROIDERY PATTERN
(5) PATTERN DATA OF PREVIOUSLY SEWN EDIT EMBROIDERY PATTERN
(6) SEWING MACHINE TYPE INFORMATION
(7) IDENTIFICATION INFORMATION OF SEWING MACHINE
(8) BANK ACCOUNT NUMBER

FIG.10

CONTENTS STORED IN ROM 62 OF SERVER (1) EQUIPMENT CONTROL PROGRAM
(2) DISPLAY CONTROL PROGRAM

FIG.11

CONTENTS STORED IN HARD DISK 64 OF SERVER (1) COMMUNICATION CONTROL PROGRAM COMMUNICATION WITH PUBLIC COMMUNICATION NETWORK (2) FOLDERS AND CONTROL PROGRAM THEREFOR (3) LIST OF INCORPORATED EMBROIDERY PATTERN CLASSIFIED BY SEWING MACHINE TYPE (4) SEWING AREA SIZE INFORMATION CLASSIFIED BY SEWING MACHINE TYPE (5) PATTERN DATA OF INCORPORATED EMBROIDERY PATTERN (FOR ALL TYPES)

(6) PATTERN DATA OF OPTIONAL SALE EMBROIDERY PATTERN (7) EMBROIDERY PATTERN SUPPLYING CONTROL PROGRAM (PATTERN DARA READOUT PROCESSING, COMMUNICATION PROCESSING, DISPLAY DATA ORIGINATION PROCESSING, PATTERN EDIT PROCESSING, CHARGE PROCESSING)

(8) SEWING MACHINE IDENTIFICATION INFORMATION BY USERS (9) LIST OF PURCHASED EMBROIDERY PATTERN BY USERS

(10) E-MAIL ADDRESS BY USERS

(11) BANK ACCOUNT NUMBER BY USERS

FIG 12

SEWING PATTERN SUPPLY SYSTEM

BACKGROUND OF THE INVENTION

1. Field of the Invention

The present invention relates to a sewing pattern supply system, and more particularly to a sewing pattern supply system employing a technique for determining whether a sewing pattern ordered on the basis of sewing machine type information in a server is incorporated in the sewing machine side and transmitting a result of determination to the sewing machine side.

2. Description of the Related Art

Electronically controlled sewing machines which perform embroidering have conventionally been capable of sewing various types of embroidery patterns. Various types of sewing patterns for embroidery sewing have been classified into types of characters, flowers, figures, shapes, etc. A control unit of the aforesaid electronically controlled sewing machine (or a sewing machine side computer connected to the control unit) is provided with a ROM incorporating pattern data of a part of types of sewing patterns. Types of the incorporated sewing patterns differ from one type of sewing machine to another. Higher grades of sewing machines incorporate a larger number of types of sewing patterns. A plurality of ROM cards or CD-ROM's on which pattern data of various sewing patterns are recorded have commercially been available conventionally. Users purchase ROM cards or CD-ROM's on which pattern data of desired sewing patterns are recorded.

Recently, a sewing machine side microcomputer connected to a control unit of an electronically controlled sewing machine is further connected via a commercial communication network such as the Internet to a server. A technique has actually been practiced in which a server, accepting an order from the computer, transmits pattern data of sewing patterns storing a multitude of pattern data of sewing patterns classified into groups of patterns. In this case, pattern display data of sewing patterns is transmitted from the server to the computer, so that a plurality of sewing patterns are displayed on a display of the computer. When a desired one or more sewing patters are selected while a plurality of sewing patterns are on display, the pattern data of the selected one or more sewing patterns (sewing pattern data) is transmitted from the server to the computer. Fee for the purchased pattern data is charged to a bank account of the user.

Type data indicative of types of sewing machines and identification data specifying sewing machines are not stored in the control units of the conventional sewing machines or sewing machine side computers in such a manner that the data are externally transmitted. Accordingly, since the data cannot automatically be transmitted to the server, the data cannot be utilized in the server.

When pattern data of sewing patterns are sold to the control units of the conventional sewing machines or sewing machine side computers as described above, type information indicative of the type of sewing machine cannot automatically be supplied to the server. Accordingly, the server supplies the user the ordered pattern data of sewing pattern irrespective of the type of the sewing machine of the order user. In other words, the server supplies the user the ordered pattern data of sewing pattern without determining whether the ordered sewing pattern is one possessed by the user (incorporated sewing pattern). As a result, there is a problem that even when the user has erroneously ordered an incorporated sewing pattern, he or she is charged for the pattern data of sewing pattern.

On one hand, when one or a plurality of characters and a decorative frame pattern are embroidered on an emblem (Wappen in Germany), embroidering is carried out after positional relations between the character patterns and the frame pattern and a rotating attitude are set, processing is carried out for setting a size of pattern to be sewn (usually referred to as pattern edit processing), and pattern data for sewing an edited pattern. Since the pattern edit processing is not carried out in the server in the conventional system, there is a problem that the pattern edit processing cannot be executed unless the pattern data of sewing pattern is purchased from the server.

On the other hand, the conventional server does not store information about sewing patterns the individual users have purchased other than information identifying the sewing machines or the users. Accordingly, there is a problem that the user is charged for the sewing pattern the user previously purchased in the same way as a newly purchased one.

Therefore, it is impossible to confirm a sewing condition obtained by editing a pattern formed by combining a plurality of sewing patterns before purchase of patterns or at the time of purchase of patterns. However, a fault may occur that a purchased sewing pattern, when edited, does not fit with a sewing area. Consequently, there is a problem that pattern data of sewing patterns is purchased in vain. Furthermore, the conventional server does not store information indicative of sewing areas of sewing machines classified in the types of sewing machines. Accordingly, even if pattern edit processing should be executed in the server, the pattern edit processing could not be carried out in relation to the sewing area of each sewing machine.

SUMMARY OF THE INVENTION

An object of the present invention is to provide a sewing pattern supply system which can solve the foregoing problems.

A sewing pattern supply system of the present invention supplying pattern data of sewing patterns from a server via a public communication network to control units of a plurality of electronically controlled sewing machines each capable of sewing a plurality of embroidery patterns, is characterized in that each control unit has a non-volatile memory storing type information indicative of a type of the sewing machine, the server has a pattern storage device storing pattern data of a plurality of sewing patterns, each control unit transmits to the server the type information read from the non-volatile memory when pattern data of a sewing pattern is purchased, and the server determines whether the ordered sewing pattern is a sewing pattern incorporated in the control unit of the ordering sewing machine, based on the type information, thereby transmitting a result of determination to the control unit.

BRIEF DESCRIPTION OF THE DRAWINGS

Other objects, features and advantages of the present invention will become clear upon reviewing the following description of an embodiment with reference to the accompanying drawings, in which:

FIG. 8 is a diagram explaining the contents stored in ROM of a sewing machine control unit;

FIG. 9 is a diagram explaining the contents stored in ROM of a computer;

FIG. 10 is a diagram explaining the contents stored in a hard disc of a computer;

FIG. 11 is a diagram explaining the contents stored in ROM of the server;

FIG. 12 is a diagram explaining the contents stored in a hard disc of the server;

DETAILED DESCRIPTION OF THE INVENTION

Figure 1:
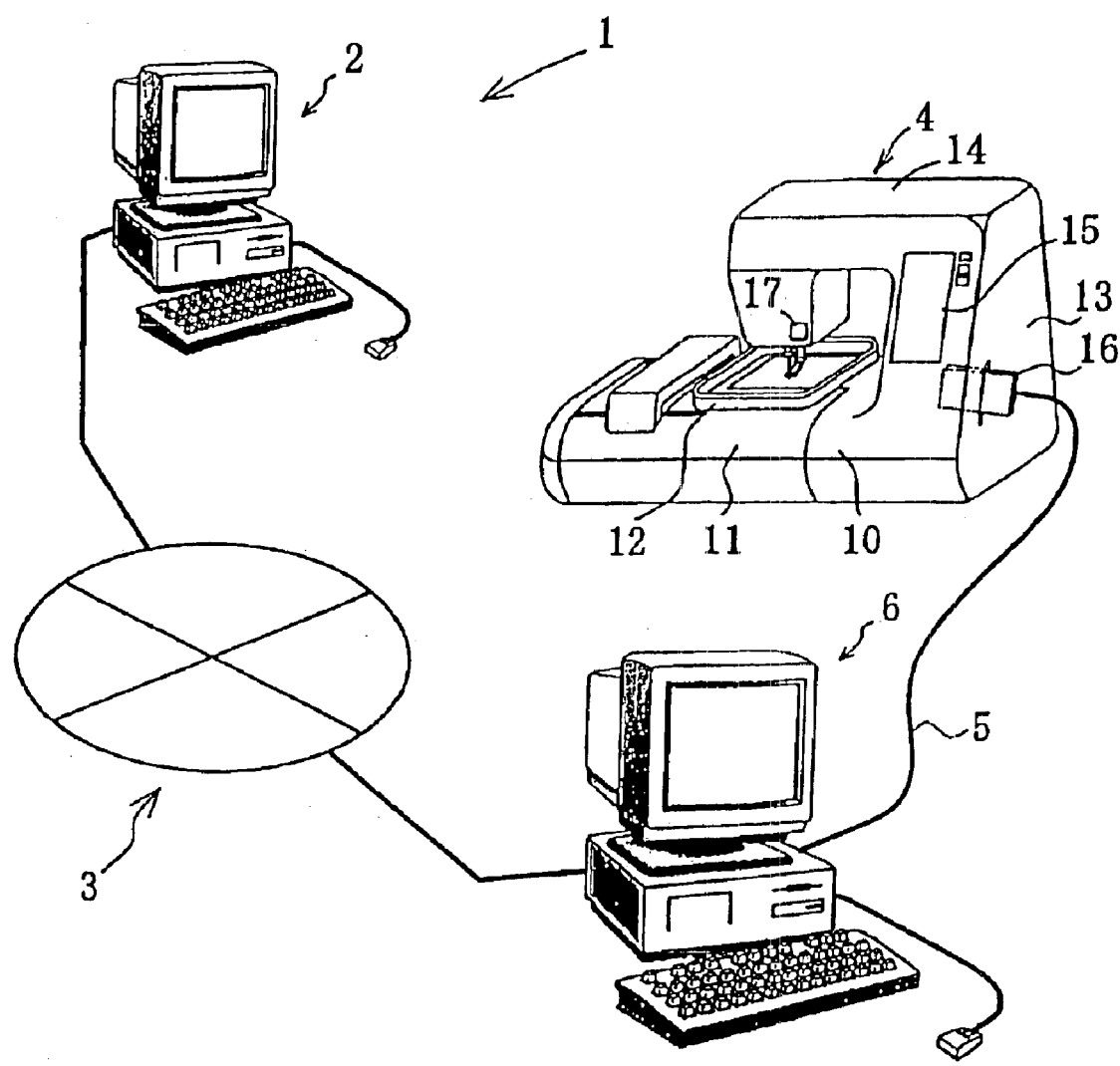
FIG. 1 is a perspective view of the embroidery pattern supply system in accordance with an embodiment of the present invention.

An embroidery pattern supply system in accordance with an embodiment of the present invention will be described with reference to the drawings. FIG. 1 shows an embroidery pattern supply system supplying pattern data of an embroidery sewing pattern from a server 2 via a public communication network 3 (for example, the Internet) to a number of types of electronically controlled sewing machines 4, in reply to an order from each sewing machine side. A computer 6 (sewing machine side computer) is connected via a cable 5 to a control unit of each electronically controlled sewing machine 4. The computer 6 is connected via the public communication network 3 to the server 2 (see FIG. 2). The server 2 is installed by a maker of the sewing machine 4, for example, and embroidery patterns are sold for users of the sewing machines 4 sold by the maker.

Firstly, the electronically controlled sewing machine 4 which can perform embroidering will be described.

The sewing machine 4 has an embroidery frame moving mechanism 11 detachably attached to a bed 10. An embroidery is sewn while an embroidery frame 12 to which a cloth is attached is being moved independently in the X-direction (left-and right direction) and the Y-direction (back-and-forth direction).

Figure 2:
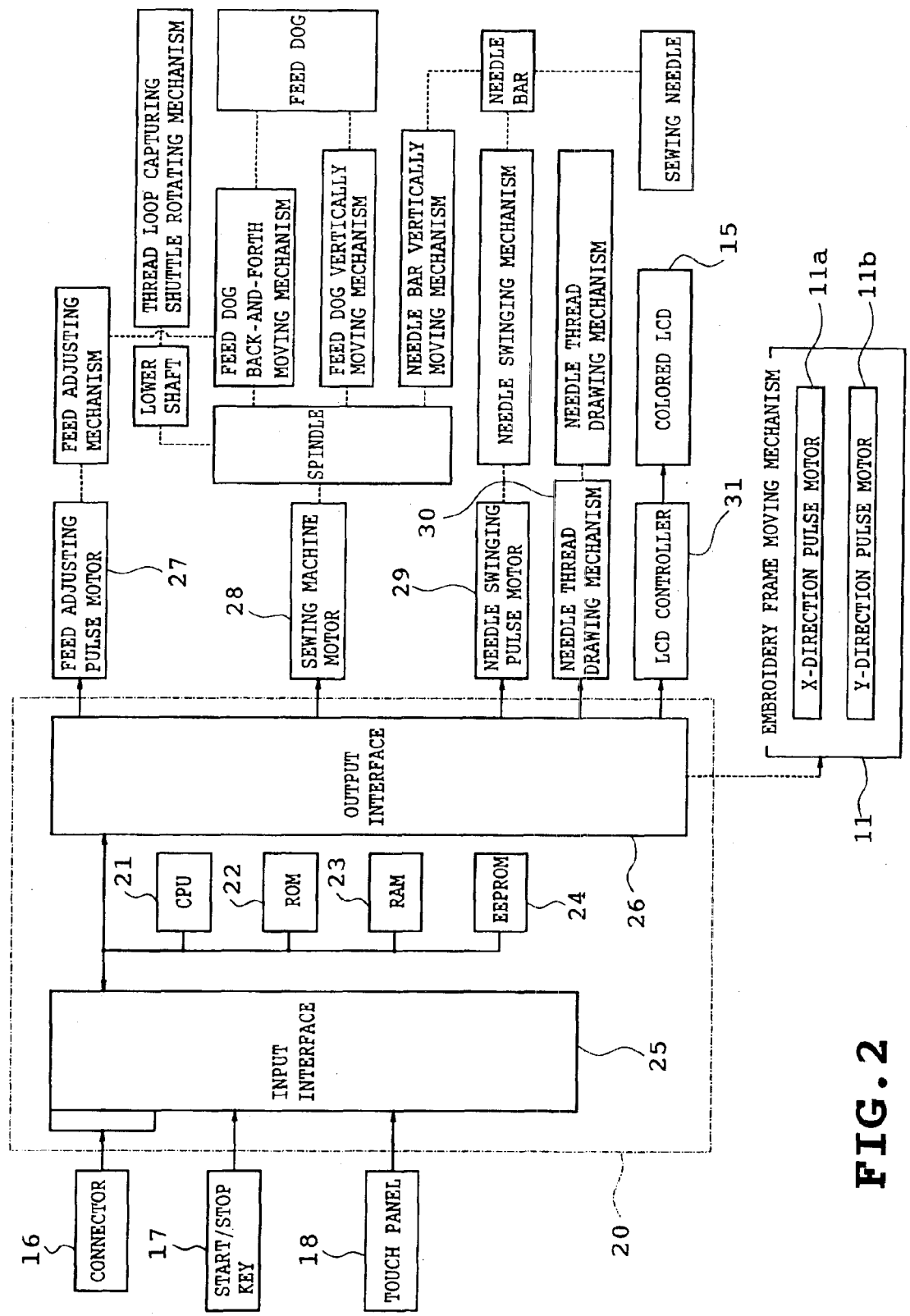
FIG. 2 is a block diagram of the control system of an electronically controlled sewing machine.
Figure 3:
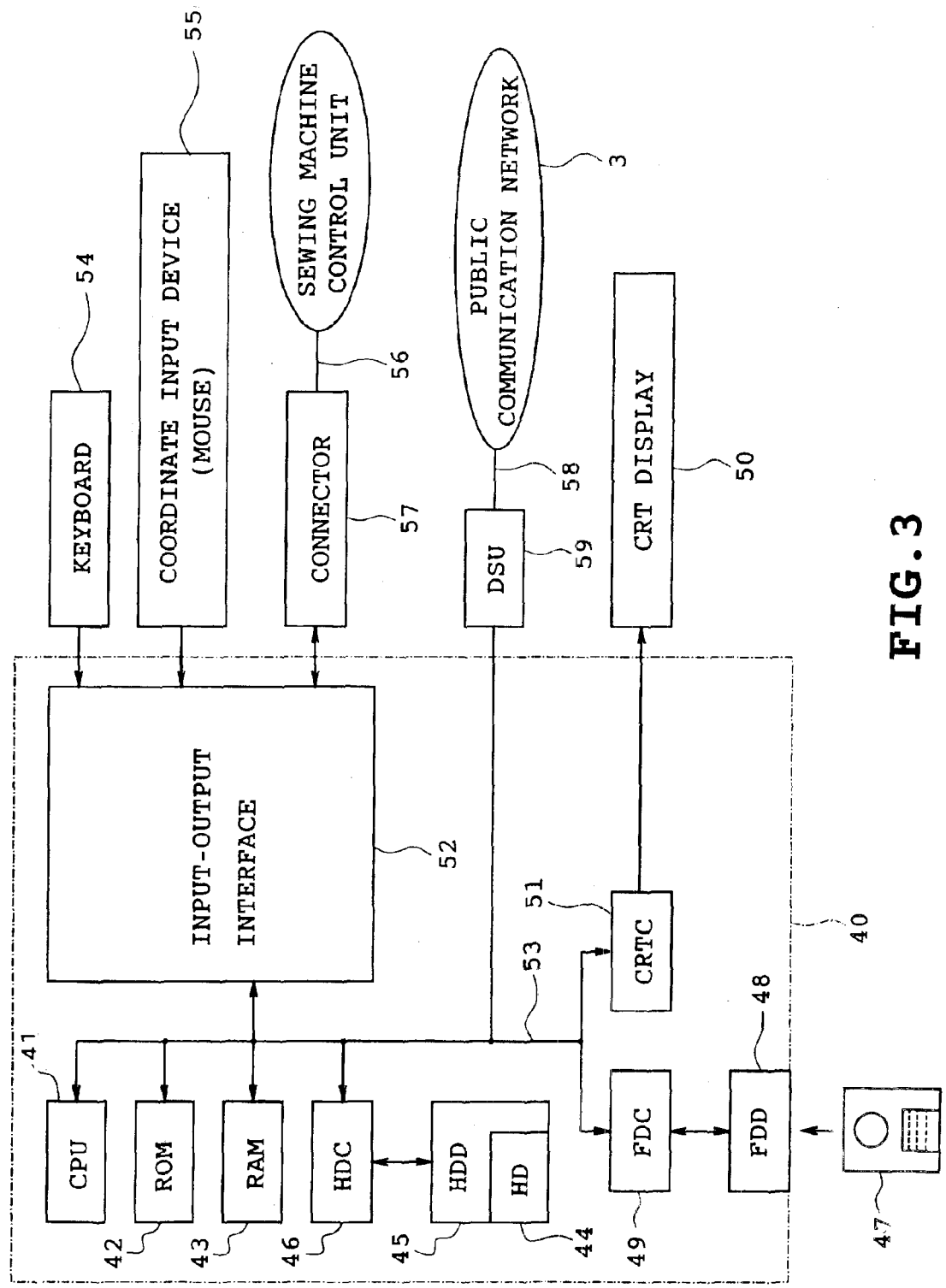
FIG. 3 is a block diagram showing the arrangement of a computer.

The sewing machine 4 is similar to an ordinary household electronically controlled sewing machine which can perform embroidering as shown in FIGS. 1 and 2. A sewing machine body of the sewing machine 4 has the bed 10, a pillar 13 and an arm 14. A spindle provided in the arm 14 is driven by a sewing machine motor 28. A needle bar is reciprocated vertically by the spindle. A needle swinging mechanism is provided for swinging the needle bar in a direction perpendicular to a cloth feed direction. The needle swinging mechanism is driven by a needle swinging pulse motor 29. In the bed 10 are provided a lower shaft linked to the spindle, a thread ring capturing shuttle rotating mechanism, a feed dog lengthwise moving mechanism, and a feed dog vertically moving mechanism, the latter three being driven by the lower shaft. A feed amount adjusting mechanism linked to the feed dog lengthwise moving mechanism is driven by a feed amount adjusting pulse motor 27.

A needle thread feeding mechanism is provided in the arm 4 for feeding a needle thread and driven by a needle thread feeding pulse motor 30. A liquid crystal display (LCD) 15 capable of displaying in color is provided on the front of the pillar 13. A touch panel 18 is provided on the overall display 15. Various instructions can be supplied when various keys displayed on the display 15 are thrust with a finger. A connector 16 is provided in the arm 13 for connecting a control unit 20 to the computer 6. A start/stop switch 17 is also provided on the head of the arm 14.

A control system of the electronically controlled sewing machine 4 will then be described.

A control unit 20 for controlling equipment of the sewing machine 4 to be controlled is comprised of a CPU 21, ROM 22, RAM 23, EEPROM 24, input interface 25, output interface 26, etc., these being connected by buses. The connector 16, start/stop switch 17 and touch panel 18 are connected to the input interface 25. To the output interface 26 are connected the feed adjusting pulse motor 27, sewing machine motor 28, needle swinging pulse motor 29, needle thread feeding pulse motor 30, an LCD controller 31 for controlling the display 15, X-direction pulse motor 11a and Y-direction pulse motor 11b of the embroidery frame moving mechanism, etc.

ROM 22 stores an ordinary sewing control program for controlling equipment necessary for an ordinary sewing in the ordinary sewing other than an embroidery sewing, an embroidery sewing control program for controlling equipment (including the embroidery frame moving mechanism 11) necessary for embroidery sewing on the basis of sewing pattern data etc. in an embroidery sewing, an equipment control program for controlling equipment to be controlled in a case other than sewing, a display control program for controlling the display 15, a communication control program for receiving commands and data from the computer 6, pattern data of incorporated embroidery patterns as will be described later, machine type information indicative of the type of sewing machine 4, size information of a sewing area, etc., these being previously stored.

Figure 5:
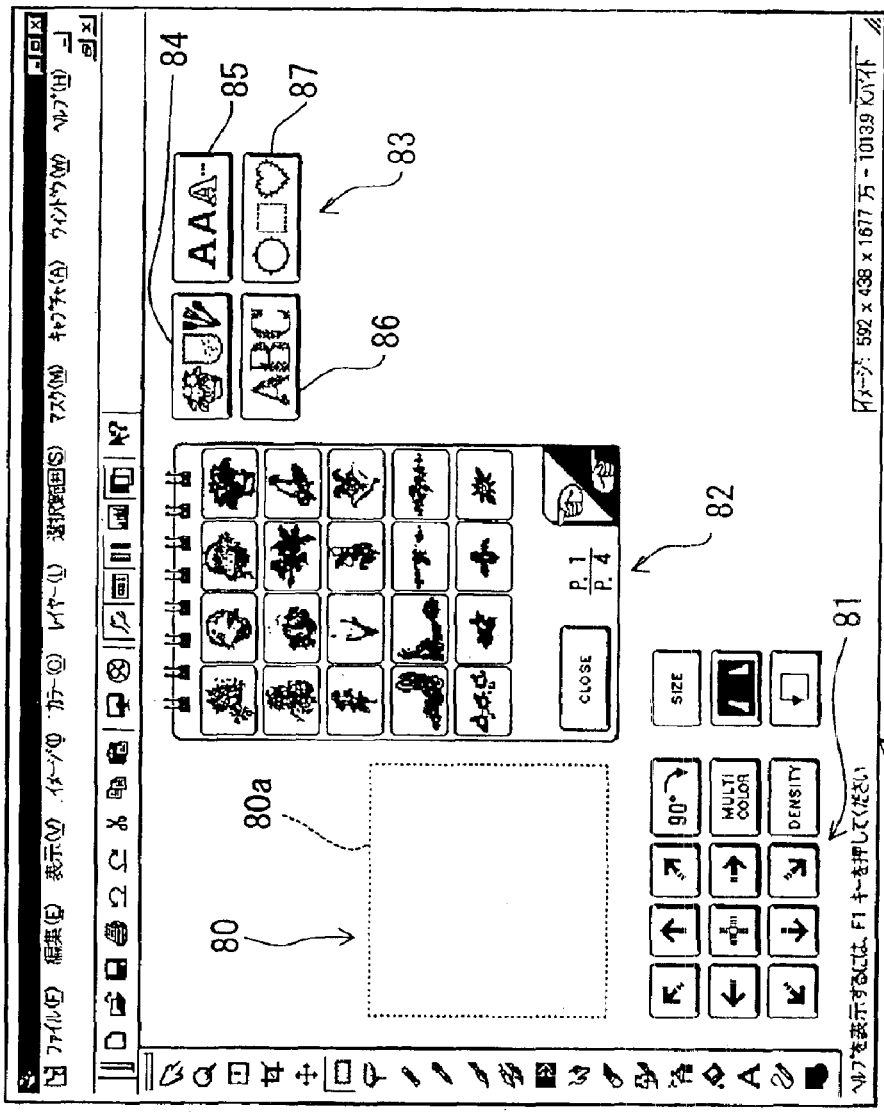
FIG. 5 is a view explaining a displayed example of a pattern selection edit image for a type A sewing machine.
Figure 6:
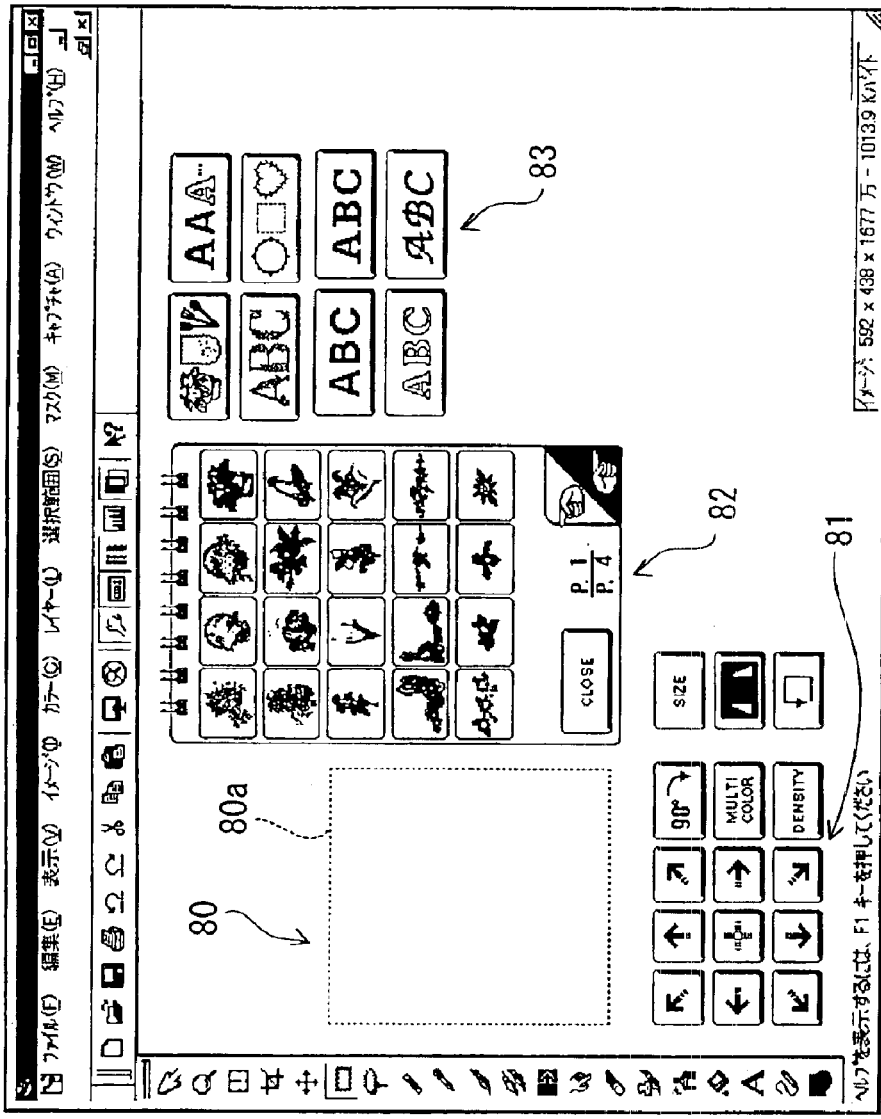
FIG. 6 is a view explaining a displayed example of a pattern selection edit image for a type B sewing machine.
Figure 7:
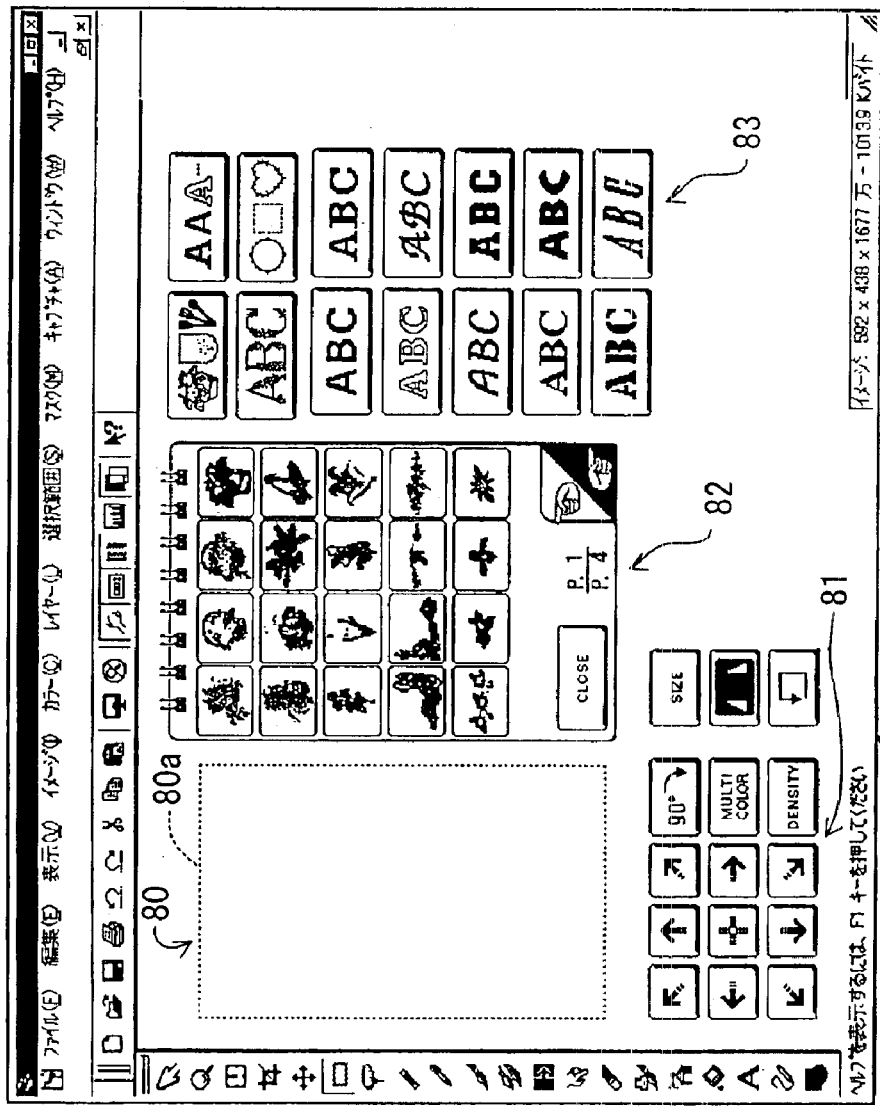
FIG. 7 is a view explaining a displayed example of a pattern selection edit image for a type C sewing machine.

For example, the embodiment includes three types A, B and C sewing machines. FIG. 5 shows a display example displayed on the display 15 of the type A sewing machine 4. FIG. 6 shows a display example displayed on the display 15 of the type B sewing machine 4. FIG. 7 shows a display example displayed on the display 15 of the type C sewing machine. FIGS. 5 to 7 show screens in the selection of an embroidery pattern or in the pattern edit processing.

A pattern display region 80 is displayed on a left part of the screen of the display 15 as shown in FIG. 5. An instruction key display region 81 is displayed below the pattern display region 80 and includes a plurality of instruction keys for instructing transfer, rotation and size of an embroidery pattern and thread density in the embroidery sewing, etc. in an embroidery pattern edit processing. On a central part of the screen are displayed a plurality of embroidery patterns in a selected pattern group and a pattern selecting key display region 82 for selecting a pattern. A pattern group selecting key display region 83 is displayed on a right part of the screen.

A rectangular sewing area 80a in which an embroidery can be sewn is framed by dot line in the pattern display region 80. For example, an actual size of sewing area for the type A sewing machine is 10×10 by cm. An actual size of sewing area for the type B sewing machine is 18×13 by cm. An actual size of sewing area for the type C sewing machine is 26×16 by cm.

ROM 22 stores the pattern data of a plurality of embroidery patterns (corresponding to incorporated embroidery patterns) which are previously stored so as to correspond to the types of the sewing machines 4, the pattern data being classified by the type and pattern group, as described above. The aforesaid pattern data of embroidery patterns includes pattern display data for displaying an embroidery pattern on the display 15 and sewing pattern data for sewing embroidery patterns. Pattern display data may be originated by operational processing from the sewing pattern data while excluding pattern display data.

In the case of FIG. 5, a flower pattern group selecting key 84, character face selecting key 85, decorative alphabet character group selecting key 86 and frame pattern group selecting key 87 are displayed on the pattern group selecting key display region 83 in the type A sewing machine. More specifically, pattern groups of embroidery patterns incorporated in the control unit 20 of the type A sewing machine 4 are three, that is, flower pattern group, decorative alphabet character group and frame pattern group. ROM 22 of the control unit 20 incorporates pattern data of a large number of embroidery patterns in these pattern groups.

The aforesaid flower pattern group includes a plurality of flower embroidery patterns. In the case of FIG. 5, a flower pattern group has been selected by the flower pattern group selecting key 84. A plurality of flower pattern keys included in the flower pattern group are displayed on the pattern selecting key display region 82. A desired flower pattern key is depressed so that the flower embroidery pattern is selected. When the decorative alphabet character group has been selected, decorative alphabet characters (A, B, C, . . . ) are displayed on the pattern selecting key display region 82. Desired alphabet characters can sequentially be selected to be edited into a character string.

In the type B sewing machine, the number of types of incorporated embroidery patterns is larger than the number of types of incorporated embroidery patterns in the type A sewing machine by four alphabet character groups each having a different font, as shown in FIG. 6. In the type C sewing machine, the number of types of incorporated embroidery patterns is larger than the number of types of incorporated embroidery patterns in the type A sewing machine by ten alphabet character groups each having a different font, as shown in FIG. 7. RAM 23 of the control unit 20 of the sewing machine 4 is a volatile memory. Various memories for aforesaid various controls are provided in RAM 23.

The computer 6 will be described.

A computer body 40 of the computer 6 comprises a CPU 41, ROM 42, RAM 43, hard disk drive 45 driving a hard disk 44, hard disk controller 46 controlling the hard disk drive, floppy disk drive 48 driving a floppy disk 47, floppy disk controller 49 controlling the floppy disk drive, CRT display controller 51 controlling a CRT display 50, input-output interface 52, etc., these being connected by a bus 53.

Furthermore, a key board 54, a coordinate input device 55 (a mouse), etc. are connected to the input-output interface 52. The connector 57 of the cable 56 connected to the control unit 20 of the sewing machine 4 is also connected to the input-output interface 52. DSU (digital service unit) 59 is provided as communication means for connecting the computer body 40 to a digital communication line 58 connected to a public communication network such as the Internet. DSU 59 is also connected to the bus 53. The communication line 58 may be an analog communication line. In this case, a communication interface applicable to an analog communication line is provided as communication means, instead of DSU 59.

The computer body 40 is connectable to various public communication networks, and a wired or wireless connection may be employed. Furthermore, a connecting system may be a one through unspecified junction points such as the Internet connection, or a private line connection system through one or more specified junction points may be employed.

ROM 42 stores a control program for controlling various apparatus such as a key board 54, mouse 55, hard disk controller 46 and floppy disk controller 49, display control program for controlling the CRT display 50, and a communication control program for receiving commands and data from the control unit 20 of the sewing machine 4, as shown in FIG. 9.

The hard disk 44 is loaded with OS (operating system) and stores various folders and control programs for causing the computer 6 to perform the same functions as an ordinary computer connected to the public communication line 3, as shown in FIG. 10. Furthermore, the hard disk 44 stores pattern data of incorporated embroidery patterns read from ROM 22 of the control unit 20 of the sewing machine 4, type information of the sewing machine 4, pattern data of a plurality of embroidery patterns previously purchased via the public communication line 3 from the server 2 and classified by a pattern type, and pattern data of edited patterns previously applied with pattern edit processing and used for embroidery sewing.

Furthermore, the hard disk 44 stores type information indicative of the type of the sewing machine 4, identification information (serial number of the sewing machine etc.) which is inherent in the sewing machine 4 and can specify the sewing machine, the identification information being registered in the server 2 (corresponding to user registration information), and a bank account number (corresponding to a payer) to which a charge is paid by transfer when an embroidery pattern has been purchased from the server 2. The identification information inherent in the sewing machine 4 is previously stored in EEPROM 24 which is a non-volatile memory and differs from every sewing machine of the same type. The inherent identification information is written onto a predetermined region of the hard disk 44 when the control unit 20 of the sewing machine 4 is connected to the computer 6.

The aforesaid ROM 42 or hard disk 44 stores control programs for various display control manners. The display 50 is capable of displaying at least an embroidery pattern selection screen and a pattern edit screen as the display 15 of the sewing machine 4 does. Thus, the display 50 can display various display contents as a display of a computer connected to the ordinary public communication network 3. That is, the display 50 of the computer 6 display a screen on the basis of screen display data transmitted from the server 2.

The server 2 will be described.

Figure 4:
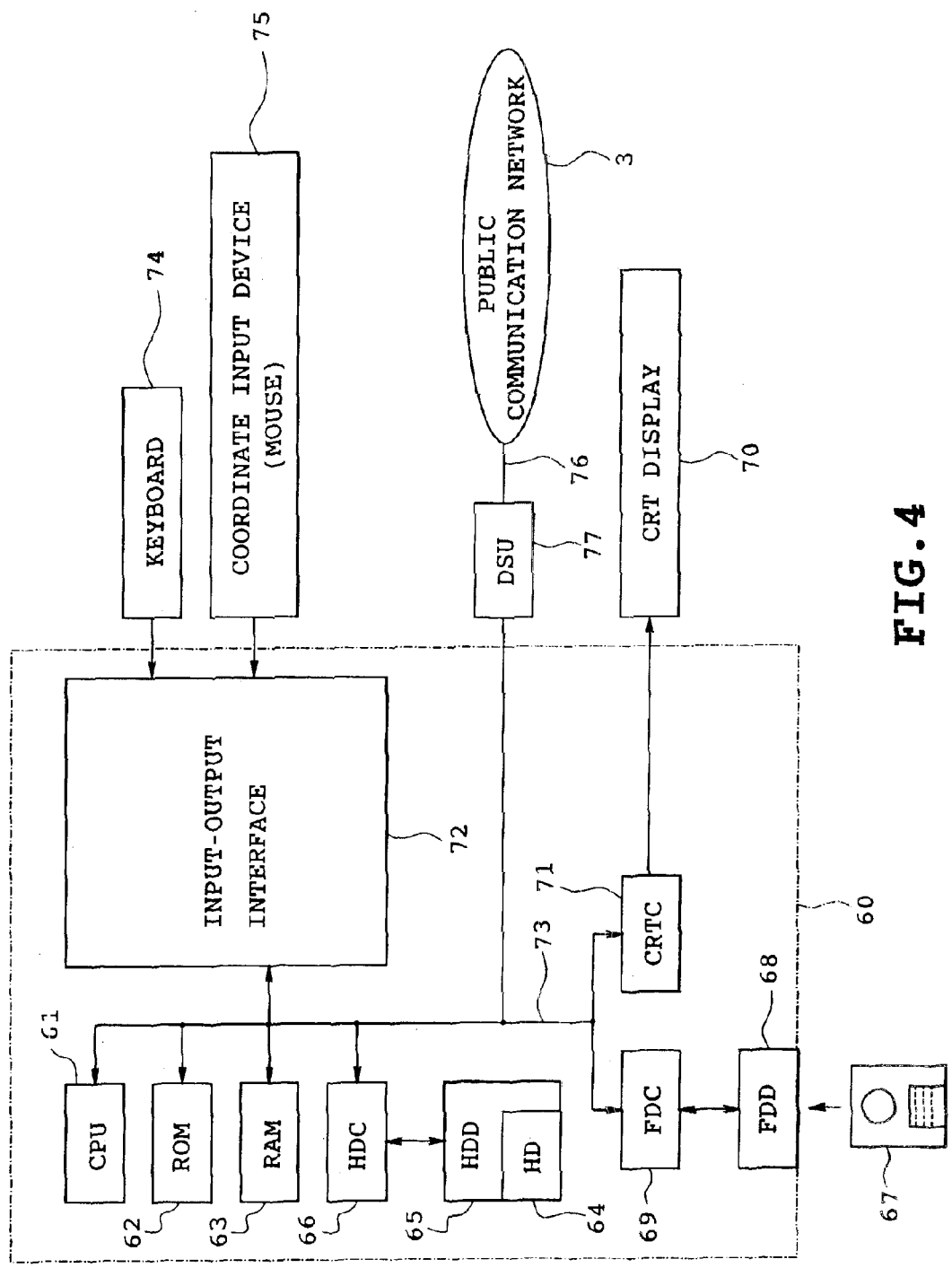
FIG. 4 is a block diagram showing the arrangement of a server.

The server 2 has a similar arrangement as the sewing machine side computer 6 as shown in FIG. 4. A server body 60 of the server 2 comprises a CPU 61, ROM 62, RAM 63, hard disk drive 65 driving a hard disk 64, hard disk controller 66 controlling the hard disk drive, floppy disk drive 68 driving a floppy disk 67, floppy disk controller 69 controlling the floppy disk drive, CRT display controller 71 controlling a CRT display 70, input-output interface 72, etc., these being connected by a bus 73.

A key board 74, a coordinate input device 75 (a mouse), etc. are connected to the input-output interface 72. DSU (digital service unit) 77 is provided as communication means for connecting the server body 60 to a digital communication line 76 connected to a public communication network such as the Internet. DSU 77 is also connected to the bus 53. ROM 62 stores a control program for controlling various apparatus such as the key board 74, mouse 75, CRT display 70, hard disk controller 66 and floppy disk controller 69, as shown in FIG. 11.

The hard disk 64 is loaded with OS (operating system) and stores various folders and control programs for causing the computer 6 to perform the same functions as an ordinary computer connected to the public communication line 3, as shown in FIG. 12. Furthermore, the hard disk 64 stores a list of incorporated embroidery patterns classified by the types of sewing machine 4, information of sewing area size classified by the types of sewing machine 4 (corresponding to sewing condition information), pattern data of incorporated embroidery patterns for all types A, B and C, pattern data of embroidery patterns of a large number of pattern groups optionally sold other that the incorporated embroidery patterns, an embroidery pattern supply control program which will be described later with reference to FIGS. 16 to 18, sewing machine identification information (user registration information) classified by users registered via the public communication network 3 by each of a large number of users, a list of purchased embroidery patterns classified by users regarding embroidery patterns previously purchased by each of a large number of users, mail addresses classified by users, bank account numbers classified by users, etc.

Figure 13:
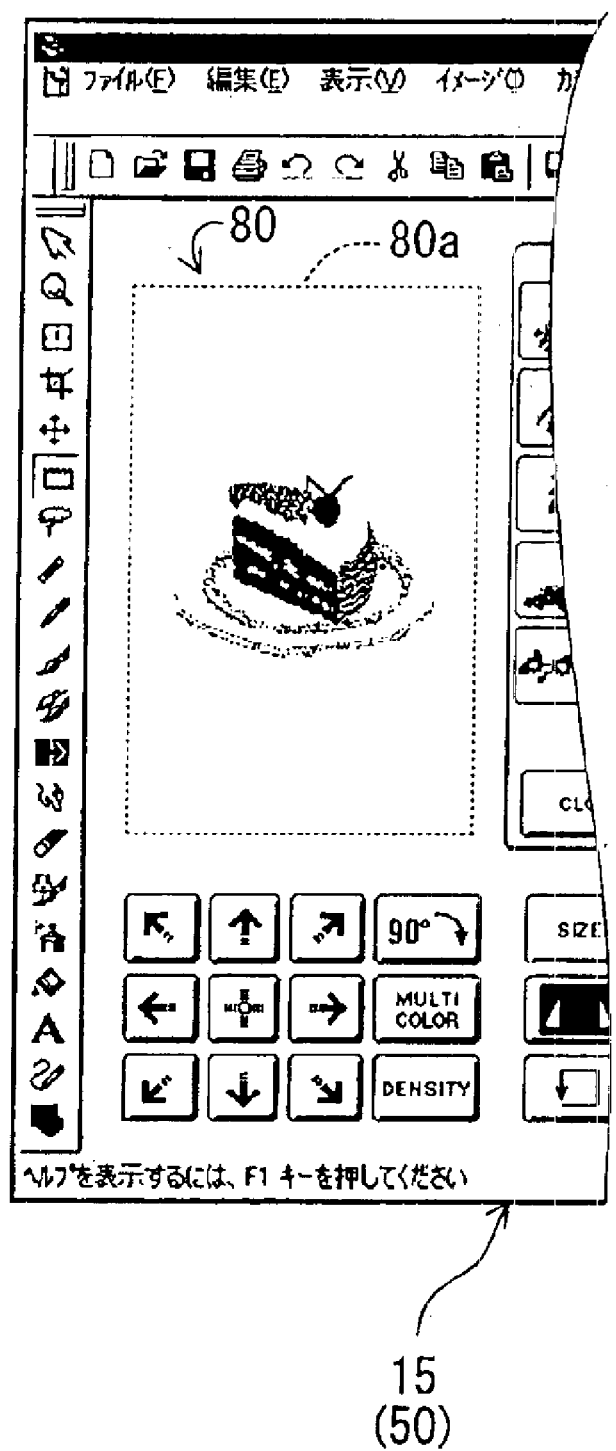
FIG. 13 is a partial view of an example of pattern on display at an initial stage of the pattern edit processing.
Figure 14:
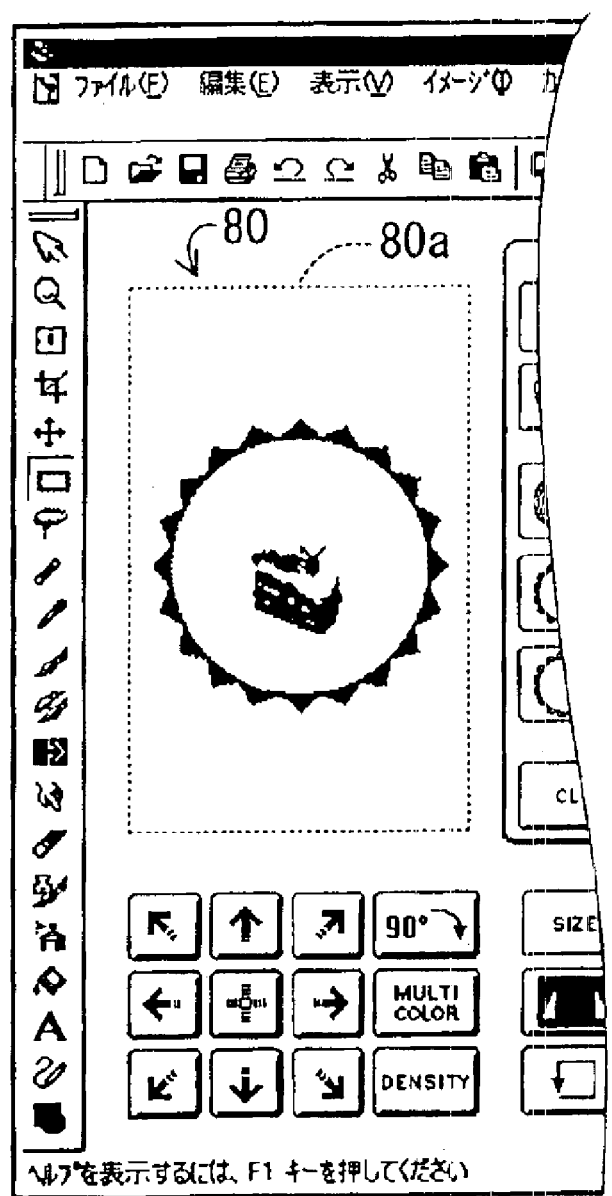
FIG. 14 is a partial view of an example of pattern on display at a middle stage of the pattern edit processing.
Figure 15:
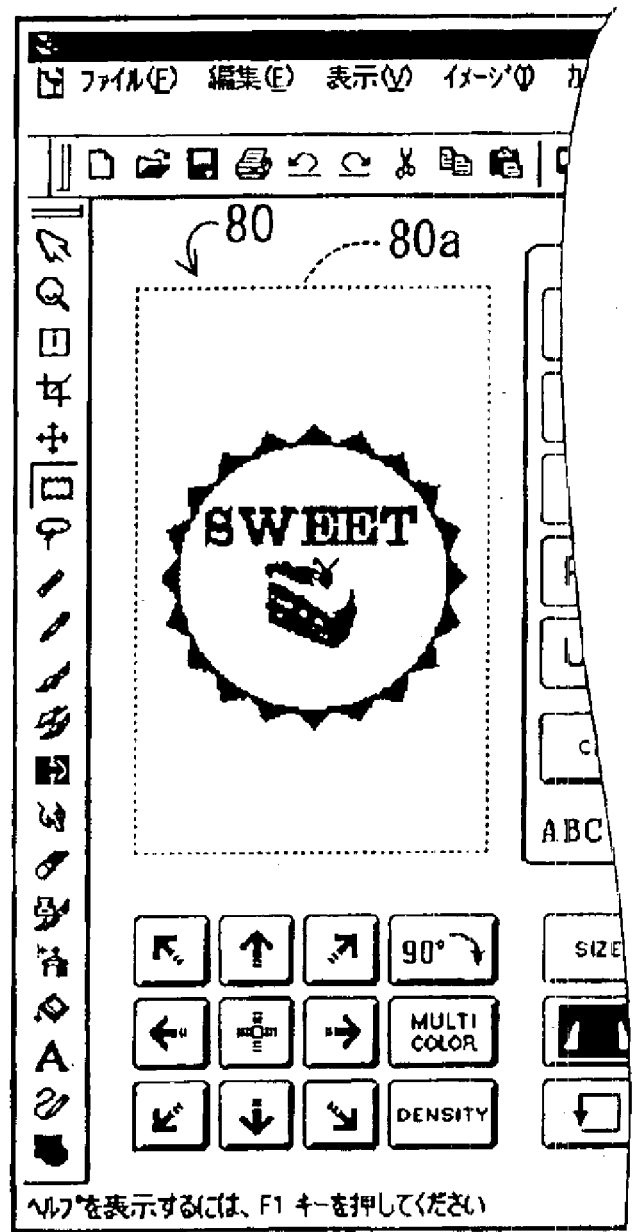
FIG. 15 is a partial view of an example of pattern on display at a latter stage of the pattern edit processing.

An example of pattern edit processing with a plurality of embroidery patterns selected will be described briefly with reference to FIGS. 13 to 15. A pattern of cake is selected as shown in FIG. 13. A frame pattern is selected, a position thereof is set so that the cake pattern is positioned inside the frame pattern, and the size of the frame pattern is adjusted as shown in FIG. 14. As shown in FIG. 15, five alphabet characters, S, W, E, E and T of a predetermined typeface are selected, positions of the characters are set, the character size is adjusted, and when the characters are arranged over the cake pattern inside the frame pattern, an edited composite pattern as shown in FIG. 15 is obtained. For example, a sewing area 80a for a type C sewing machine 4 is shown by dot line. Since the composite pattern is within the sewing area 80a, it is found that the composite pattern can be sewn in the sewing area.

An embroidery pattern ordering control will be explained. In the embroidery pattern ordering control, the sewing machine side computer 6 is connected via the public communication network 3 to the server 2 and a desired embroidery pattern is ordered. Symbol Si (i=1, 2, . . . ) in flowcharts designates each step.

Figure 16:
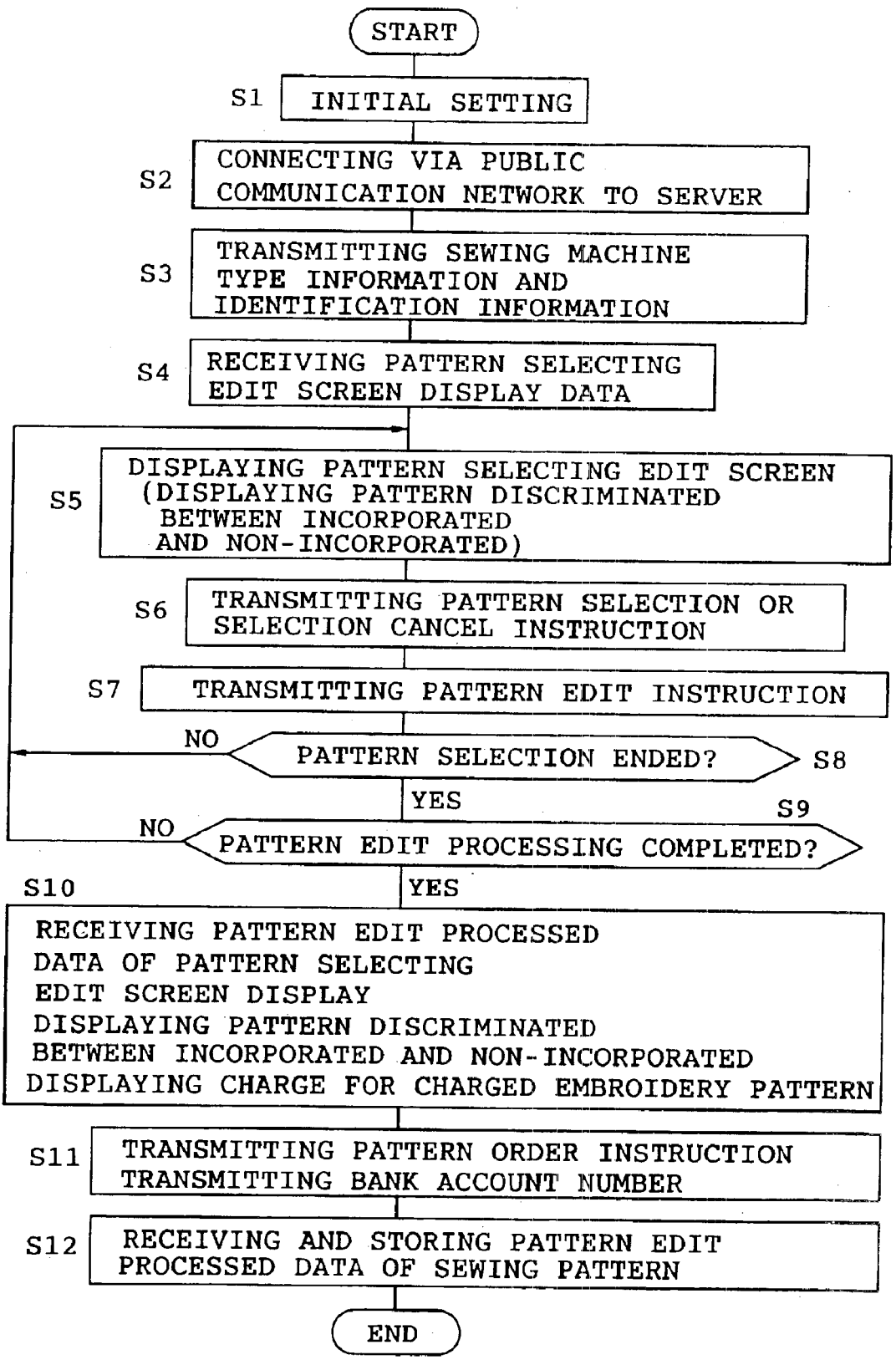
FIG. 16 is a flowchart of embroidery pattern ordering control performed by the computer.

As shown in the flowchart of FIG. 16, necessary initial setting is carried out after start of the control (S1) and the computer 6 is connected via the public communication network 3 to the server 2 (S2). The computer 6 then reads the type information of the sewing machine 4 and identification information inherent in the sewing machine from the hard disk 44, transmitting the information to the server 2 (S3).

A pattern selection edit screen (a screen such as shown in FIG. 5, for example) is displayed on the display 50 on the basis of pattern selection edit screen display data transmitted from the server 2 (S5). The pattern selection edit screen display data contains display data of each key (or button) indicated by an icon on the screen, display position data, data indicative of a pattern number in the case where the icon indication is an embroidery pattern, command data in the case where the icon indication is an edit instruction key such as enlargement, reduction, transfer or rotation of an embroidery pattern. In this case, display data for identifying whether the pattern is incorporated in the control unit 20 of the sewing machine 4 (that is, in the computer 6). The display 50 displays an incorporated or non-incorporated pattern discriminately.

As a manner of the discriminate display, an overall pattern group of incorporated patterns is framed and characters of "incorporated patterns" are displayed. However, the manner should not be limited this. The pattern group selecting key display region 83 may be divided into an incorporated pattern region and a non-incorporated pattern region, and patterns may be displayed discriminately together with characters, "incorporated pattern" or "non-incorporated pattern." Subsequently, a pattern selecting instruction or a selection canceling instruction is transmitted to the server 2 (S6), and subsequently, an instruction for pattern edit is transmitted to the server 2 (S7).

Subsequently, whether the pattern selection should be finished is determined on the basis of an operator's instruction regarding the display of question to the screen (S8). Control returns to step S5 when the determination is negative. When the determination at step S8 is positive, whether the pattern selection should be finished is determined on the basis of an operator's instruction regarding the display of question to the screen, at step S9. Control returns to step S5 when the determination is negative. Control advances to step S10 when the determination is positive at step S9. While the steps S5 to S9 are repeated at a number of times, selection of an embroidery pattern is made and an instruction is transmitted to the server 2 and an instruction of pattern edit processing is transmitted to the server 2.

In the selection of embroidery pattern at step S6, a pointer displayed on the screen is moved by the mouse 55 so that a key on the screen is pointed by the pointer to be clicked (double click), whereby the embroidery group is selected. When a desired one of a plurality of embroidery patters displayed in the pattern selecting key display region 82 is designated by the pointer and mouse 55, whereby the embroidery pattern is selected, the computer 6 reads information indicative of the selected embroidery pattern (for example, pattern specifying information such as pattern number) and transmits the information to the server 2. Thus, one or a plurality of embroidery patterns can be selected.

A key for designating an optional sale embroidery pattern non-incorporated in all types of sewing machines is displayed on the screen although the key is not shown. When the key is designated by the pointer, a plurality of pattern groups of the optional sale embroidery patterns are sequentially displayed so that pattern selection can be carried out in the same manner as described above. Furthermore, when an instruction for edit of an embroidery pattern is transmitted, various keys displayed in an instruction key display region 81 are designated by the pointer.

Subsequently, pattern edit processed data of pattern selecting edit screen display is received from the server 2 and the received pattern selecting edit screen is displayed on the display 50.

At this time, not only the displayed embroidery pattern is discriminated between incorporated one and non-incorporated one, but also costs of charged embroidery patterns are displayed. A previously purchased embroidery pattern is free of charge even though it is a non-incorporated embroidery pattern. Accordingly, a charged embroidery pattern is a non-incorporated embroidery pattern which was not purchased from the server 2 (and which is purchased for the first time).

Subsequently, a pattern order instruction is transmitted to the server 2, and information required for automatic transfer from a bank, for example, a bank account number and nominee are also transmitted to the server 2, as step S11. Subsequently, edit processed sewing pattern data is received from the server 2 to be stored on the hard disk 44, at step S12, and thereafter the control is finished.

Figure 17:
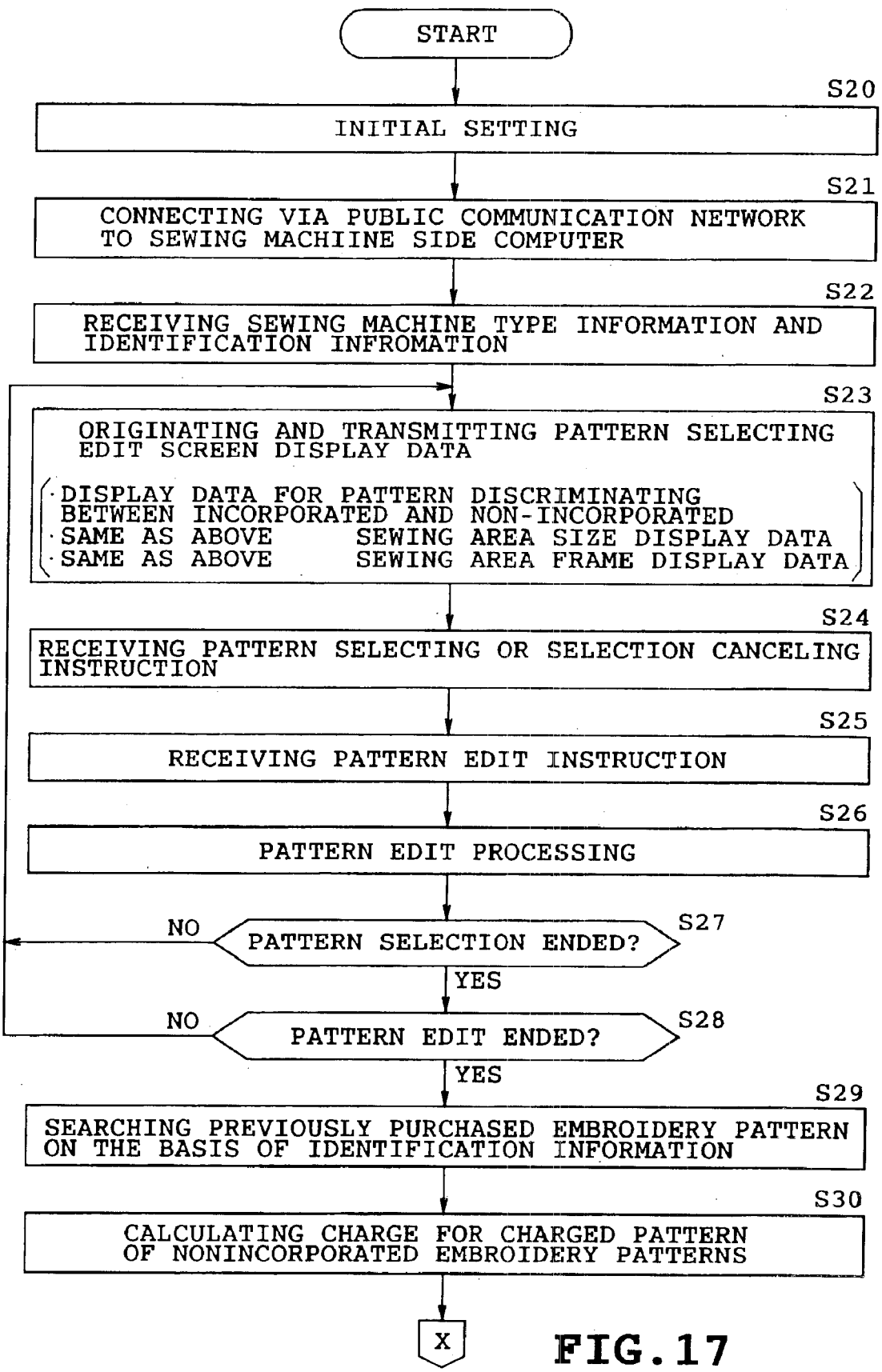
FIG. 17 is one part of flowchart of embroidery pattern supplying control performed by the server.
Figure 18:
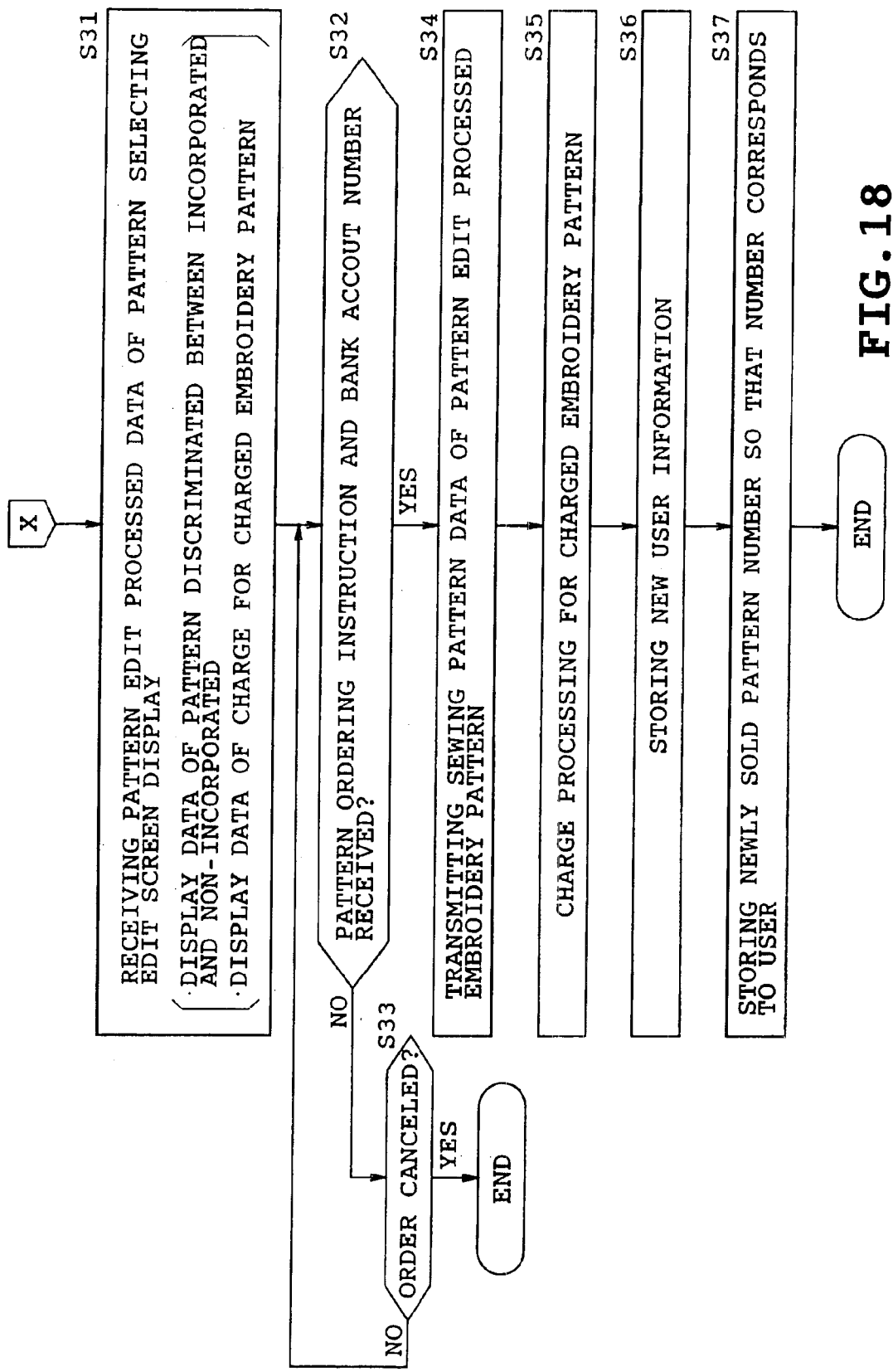
FIG. 18 is the other part of embroidery pattern supplying control performed by the server.

An embroidery pattern supplying control carried out in co-operation with the embroidery pattern ordering control in the server 2 will now be described with reference to FIGS. 17 and 18.

The control starts upon access by the computer 6, and an initial setting is firstly carried out (step S20). Subsequently, the server 2 is connected via the public communication network 3 to the computer 6 (step S21) and subsequently receives from the computer 6 sewing machine type information and identification information to identify the sewing machine (step S22).

Subsequently, pattern selecting edit screen display data to display an embroidery selecting edit screen is originated and transmitted to the computer 6. At this time, also transmitted are sewing area size display data to display by a numeral a sewing area size according to the type of sewing machine 4 and sewing area frame data to display a sewing area frame (for example, a sewing are frame 80*a* as shown in FIG. 5). The aforesaid display data includes display data for displaying the selected embroidery pattern in the sewing area 80*a* on the screen.

More specifically, on the basis of the received sewing machine type information, the corresponding sewing area size is read from the sewing area size data by types stored on the hard disk 64. Character data for displaying the read sewing area size by numeral is transmitted, and sewing area frame display data, which is used to display a sewing area frame having a size based on the size of the read sewing area, is originated and transmitted.

Accordingly, the display 50 of the sewing machine side computer 6 displays a sewing area having a size in compliance with the data. Thereafter, when receiving a command instruction from the sewing machine side computer 6, the server 2 carries out corresponding processing and transmits to the computer 6 update data for updating the pattern selecting edit screen. In the embodiment, the above-described data transmission and reception are carried out in compliance with known HTML protocol since the computer is connected via the Internet. However, the protocol for data transmission and reception should not be limited to the HTML language.

Subsequently, a pattern selecting instruction or selection canceling instruction is received from the computer 6 (step S24), and then, the instruction indicating the pattern edit processing is received from the computer 6 (step S25), and the pattern edit processing is carried out at step S26. In this case, in response to the pattern electing instruction transmitted from the sewing machine side computer 6, the pattern data of selected embroidery pattern is read from the hard disk 64, and display data for the pattern selecting screen display is read from the hard disk 64. The selected embroidery pattern is disposed in the sewing area 80*a* within the pattern display region 80 of the pattern selecting edit screen. Display data indicative of the state of the embroidery pattern is transmitted to the sewing machine side computer 6.

At this time, the selected embroidery pattern is displayed on the display 50 of the sewing machine computer 6 in the form of a display icon indicative thereof in a default size. A display mode is a selection state (active state) in which the display contrast differs from one in a normal display state. The display position is set at a default position (for example, central position) of the sewing area frame displayed as sewing area size peculiar to the sewing machine. In this display state, when an operator of the sewing machine side computer 6 indicates a desired command key for the edit processing by the pointer and clicks the key, the computer 6 transmits to the server 2 command data of the clicked command key and data indicative of a pattern number indicative of a presently active embroidery pattern.

When a plurality of embroidery patterns are displayed and an embroidery pattern other than the default embroidery pattern which is in the active state is desired to be edited, the operator indicates by the pointer the embroidery desired to be edited so that the indicated embroidery pattern is turned into the active state, and then clicks a desired command key. Thus, the arrangement, rotated attitude and size of an embroidery pattern are set on the basis of the instruction indicative of the pattern edit processing, so that the display data is updated and the processing for transmitting display data to the sewing machine side computer 6 is repeated. At a final stage of the edit processing, sewing pattern data of a composite pattern after edit processing is also originated.

Subsequently, at step S27, whether the pattern selection has been finished or not is determined on the basis of an instruction from the computer 6. In the case of "No," the control returns to step S23. In the case of "Yes," whether the pattern edit has been finished is determined at step S28. In the case of "No," the control returns to step S23. The foregoing is repeated so that selection of necessary pattern and the pattern edit processing are carried out. When these are completed, the determination at step S29 becomes positive ("Yes") and the control advances to step S29. Subsequently, at step S29, a list of purchased embroidery patterns by the users stored in the hard disk 64 is searched on the basis of identification information to specify the sewing machine 4 and the user, the information being received at step S22. Subsequently, at step S30, the control detects a newly purchased charged pattern out of non-incorporated patterns included in the newly ordered embroidery patterns, and calculates charges.

More specifically, upon completion of the pattern edit, the pattern in the edited state is a piece of information the user wishes to purchase and accordingly, the server 2 stores pattern numbers, arrangement positions and sizes of all the embroidery patterns having been selected upon completion of edit. The server 2 then determines whether the selected embroidery pattern is incorporated in the sewing machine 4 side, based on the sewing machine type information received at step S22 and the list of incorporated patterns by the types. When the pattern is not the incorporated one, the server 2 determines whether the pattern has not been purchased, based on the user information received at step S22 regarding the embroidery patterns which are not incorporated patterns and the list of purchased embroidery patterns by the users. Charge data is read from a charge list by the embroidery patterns stored in a predetermined storage region regarding the unpurchased embroidery patterns, so that sum total of charge is calculated concerning all the unpurchased embroidery patterns.

Subsequently, at step S31, display data for displaying the pattern edit processed pattern selecting edit screen and the calculated sum total is originated and transmitted to the computer 6. Subsequently, whether a pattern order instruction and information required for charging such as the bank account number or the like have been received from the sewing machine side is determined. When the determination is "No," whether order has been canceled is determined at step S33. When the determination is "No" at step S33, the control returns to step S32. When the order has been canceled, the control finishes this control. When the determination is "Yes" at step S32, sewing pattern data of the pattern edit processed embroidery pattern is transmitted to the computer 6 at step S34. The transmitted bank account number is collated with that stored in the hard disk 64 thereby to be confirmed.

Subsequently, charge processing is carried out for the charged embroidery pattern (step S35). When the user is a new comer, new user information (identification information for specifying the sewing machine or user, and bank account number, etc.) is stored in the hard disk 64 (step S36).

Subsequently, the pattern number of the embroidery pattern newly sold to the user is stored in the list of purchased embroidery patterns by the users in the hard disk 64 so as to correspond to the user, and thereafter, the control is ended.

The following effects can be achieved according to the foregoing embroidery pattern supply system, method, server 2, and program.

The sewing machine type information is stored in ROM 22 of the control unit 20 at the sewing machine 4 side and the hard disk 44 of the computer 6. In the order of an embroidery pattern, the type information is automatically transmitted from the sewing machine 4 side to the server 2. Consequently, supply of type information can be simplified. At the server 2 side, the type information is effectively utilized so that whether the pattern is an incorporated pattern can be determined or other determination can be made.

Whether the pattern is an incorporated or non-incorporated pattern (the pattern not incorporated in the sewing machine 4) is determined. Since the user is charged only for the non-incorporated pattern, the user can be escaped from feeling a loss. Furthermore, the identification information to identify the user is also transmitted from the sewing machine 4 side to the server 2 side in addition to the type information. A list of embroidery patterns the user previously purchased is stored at the server 2 side. Since the user is charged only for newly purchased embroidery patterns out of the non-incorporated patterns, the user can be escaped from feeling a loss.

The pattern edit processing is carried out for the embroidery pattern the user ordered, at the server 2 side on the basis of the instruction to instruct pattern edit at the user side. An embroidery pattern is ordered or edit processing is instructed while the pattern during or after the edit processing is being displayed on the display 50 of the sewing machine side computer 6. Consequently, the user can formally order the embroidery pattern after the state of the processed embroidery pattern has been confirmed. Accordingly, the user can be prevented from purchasing an embroidery pattern which will be useless after the purchase for the reason that the pattern cannot fit a sewing area of the sewing machine 4 or for another reason.

On the other hand, the embroidery pattern edit processing is carried out at the server 2 side. After the embroidery pattern edit processing, the sewing pattern data is transmitted to the sewing machine side computer 6 after the embroidery pattern edit processing has been carried out and subsequently the user has formally ordered the embroidery pattern. Consequently, the sewing pattern data need not be originated by the embroidery pattern edit processing at the sewing machine 4 side and accordingly, no pattern edit processing program need not be provided at the sewing machine 4 side. This is advantageous in the equipment economy at the sewing machine 4 side. The cost of the sewing machine can be reduced in the case of household embroiderable electronically controlled sewing machines.

An incorporated pattern and non-incorporated pattern are displayed so as to be discriminated therebetween when a pattern for which pattern edit processing has been carried out at the server 2 side is displayed on the display 50 of the sewing machine side computer 6. This is convenient when the user decides what embroidery pattern should be ordered.

Furthermore, the sewing area size is also displayed on the screen of the display 50, and the sewing area 80a displayed in the pattern display region 80 of the screen is framed. This is convenient when the user considers the pattern edit processing and when a pattern is edited so as to be located within an actual sewing area in the sewing machine 4. Moreover, the pattern edit processing is carried out at the server 2 side in consideration the type of the sewing machine 4 and the sewing area (corresponding to a sewing condition). Consequently, an actual pattern edit processing suitable for the sewing machine 4 can be carried out.

Subsequently, the following describes partially modified forms of the embroidery pattern supply system, method, server 2 and program.

1) The sewing machine 4 has three types A to C in the foregoing embodiment. However, the number of types should not be limited to three. The foregoing embroidery pattern supply may be executed in all or a part of the types of sewing machines of the sewing machine maker. Furthermore, the number of types of incorporated patterns in the sewing machine 4 is relatively small. However, the types and number of pattern groups of incorporated patterns should not be limited to those described above.

2) In the foregoing embodiment, the computer 6 stores pattern data of embroidery patterns and the like. An embroidery pattern is supplied from the server 2 to the computer 6 while commands and instructions are received between the computer 6 and server 2. However, the computer 6 may be eliminated and the control unit 20 of the sewing machine 4 may have a function of communication via the public communication network 3 with the server 2.

3) In the foregoing embodiment, out of the ordered non-incorporated patterns, the embroidery patterns the user previously purchased in the past are not charged. However, any non-incorporated pattern may be charged whether it was purchased in the past or not.

4) In the foregoing embodiment, whether the edited pattern exceeds the sewing area is not determined in the pattern edit processing, but the user determines, while viewing the screen. However, the determination may be made in the server 2.

5) In the foregoing embodiment, display data of the same pattern selecting edit screen as the pattern selecting edit screen at the sewing machine side is originated in the server 2 and transmitted to the computer 6. Display data of pattern selecting edit screen for use only by the server 2 may be originated and transmitted to the computer 6.

6) The server 6 may originate color print data or printing data for printing the edit pattern processed by the pattern edit processing in the same state and same size as an embroidered one and transmit the data to the computer 6 so that an embroidery pattern can be printed by a color printer on the basis of the printing data.

7) The foregoing embodiment exemplifies the case where pattern data of embroidery pattern (corresponding to a sewing pattern) is supplied from the server 2 to the sewing machine side. However, other than the embroidery pattern, pattern data of sewing pattern for pattern sewing may be supplied from the server 2 to the computer 6 together with the pattern data of embroidery pattern or separately.

8) The foregoing embodiment exemplifies the case where the embroidery pattern is supplied from the server 2 to the household electronically controlled sewing machine. However, pattern data of embroidery pattern may be supplied from the server 2 to electronically controlled sewing machines for business purposes or multi-needle type embroidery sewing machines for business purposes.

9) The foregoing embodiment exemplifies the case where bank account is used in order that the server 2 may charge the user. However, a charging system by the electronic money may be employed. Furthermore, in the foregoing embodiment, data of the bank account is transmitted so that the user is charged on the bank account. However, the user who is not a new comer may be charged on the bank account whose data is stored in the server 2.

10) In the foregoing embodiment, only the newly purchased embroidery pattern out of the non-incorporated patterns is charged. However, when a unit charge per embroidery pattern is set low, the users may be charged for all the embroidery-patterns. Furthermore, in the foregoing embodiment, the user is not charged for the embroidery pattern processing. However, the user may be charged for the embroidery pattern processing.

The sewing pattern supply system of the present invention supplies pattern data of sewing patterns from a server via a public communication network to a sewing machine side computer connectable to control units of a plurality of electronically controlled sewing machines which can sew a plurality of embroidery patterns, respectively, is characterized in that the computer has a non-volatile memory storing type information indicative of a type of the sewing machine, the server has a pattern storage device storing pattern data of a plurality of sewing patterns, the computer transmits to the server the type information read from the non-volatile memory when pattern data of a sewing pattern is purchased, and the server determines whether the ordered sewing pattern is a sewing pattern incorporated in the computer of the ordering sewing machine side, based on the type information, thereby transmitting a result of determination to the computer of the sewing machine side.

When pattern data of embroidery pattern is to be purchased from the server, the sewing machine side computer reads the type information from the non-volatile memory, transmitting the information to the server. Based on the type information, the server determines whether the ordered sewing pattern is one of the sewing patterns incorporated in the ordering sewing machine side computer and transmits the result of determination to the control unit. Accordingly, the sewing machine side computer can reliably prevent an erroneous order of a sewing pattern incorporated therein.

The sewing pattern supply system of the present invention is characterized in that the server has an incorporated pattern information storage device storing incorporated pattern information indicative of incorporated sewing patterns incorporated in the control unit of the sewing machine or the sewing machine side computer connectable to the control unit, and the server has a pattern determining unit determining whether the ordered sewing pattern is the incorporated sewing pattern, based on the incorporated pattern information incorporated in the incorporated pattern storing device and the type information supplied from the ordering sewing machine side.

The incorporated pattern information storage device stores incorporated pattern information which is indicative of the sewing patterns incorporated in the sewing machine side control unit or computer and which is classified by the sewing machine types. The pattern determining unit of the server determines whether the ordered sewing pattern is the incorporated sewing pattern, based on the incorporated pattern information of the incorporated pattern storing device and the type information supplied from the ordering sewing machine side.

The sewing pattern supply system of the present invention is characterized in that the server obtains a charge of the sewing pattern determined not to be an incorporated sewing pattern by the pattern determining unit out of the ordered sewing patterns, thereby transmitting the charge to the sewing machine side. Accordingly, since the fee for the sewing pattern other than the incorporated sewing pattern out of the ordered sewing patterns is transmitted, the user can confirm the fee, viewing it, or reexamine whether the order of the sewing pattern should be required or whether this is exactly the sewing pattern to be ordered. Moreover, the server 2 can charge only for the sewing pattern other than the incorporated sewing patterns.

The sewing pattern supply system of the present invention is characterized in that the server charges a payer designated by the ordering sewing machine side with the obtained charge. Thus, since the payer designated by the ordering sewing machine side is charged, the fee can reliably be collected.

The sewing pattern supply system of the present invention is characterized in that the server has user registration information which is transmitted from the sewing machine side and is capable of identifying a user and a user information storage device storing a purchased pattern list of sewing patterns the user previously purchased.

Thus, since the user information storage device stores the user registration information and the purchased pattern list of sewing patterns, a charging system which does not charge for the sewing pattern the user previously purchased can be employed.

The sewing pattern supply system of the present invention is characterized in that the server obtains a fee of a newly purchased sewing pattern not contained in the purchased pattern list out of sewing patterns not incorporated in the control unit of the ordering sewing machine further out of the ordered sewing patterns, thereby transmitting the charge to the sewing machine side. The charge for a newly purchased sewing pattern is obtained which is not contained in the purchased pattern list out of sewing patterns not incorporated in the control unit of the ordering sewing machine further out of the ordered sewing patterns. Since the fee is transmitted to the sewing machine side, the user can find the fee for the newly purchased sewing pattern. Consequently, the user can get a collect fee of the purchased sewing pattern.

The sewing pattern supply system of the present invention is characterized in that the server charges a payer designated by the ordering sewing machine side with the obtained charge. Thus, only the sewing pattern the user newly purchased is reliably be charged and the fee can reliably be collected since the payer designated by the ordering sewing machine side is charged for the fee.

The sewing pattern supply server of the present invention supplying a server supplying pattern data of sewing patterns via a public communication network to a sewing machine side computer connectable to control units of a plurality of electronically controlled sewing machines which can sew a plurality of embroidery patterns is characterized by a pattern storage device storing pattern data of a plurality of sewing patterns, an incorporated pattern information storage device storing incorporated pattern information referring to incorporated sewing patterns incorporated in the control units of a plurality of sewing machines, and a determining unit determining whether the sewing pattern ordered at the sewing machine side is the incorporated sewing pattern incorporated in the control unit or computer of the ordering sewing machine.

When a sewing pattern is ordered from the sewing machine side to the server, the server reads the corresponding pattern data of the sewing pattern from the pattern storage device while reading the incorporated pattern information from the incorporated pattern information storage device, so that the server determines, by the determining unit, whether the ordered sewing pattern is the incorporated sewing pattern incorporated in the control unit of the ordering sewing machine or the computer, based on the type information of the sewing machine supplied from the sewing machine side.

The sewing pattern supply server of the present invention is further characterized by a pattern edit processing unit applying a pattern edit processing to the sewing pattern ordered by the sewing machine side, based on a command which is supplied from the sewing machine side and is indicative of editing the sewing pattern. Thus, the pattern edit processing unit applies the pattern edit processing to the sewing pattern ordered by the sewing machine side on the basis of the command instructing to edit the sewing pattern supplied from the sewing machine side. Consequently, since the result of the pattern edit processing can be supplied to the sewing machine side, the user can determine whether the sewing is possible and whether the pattern edit is suitable, after reviewing the result of pattern edit processing.

The sewing pattern supply program realizes on a computer the function of applying the a pattern edit processing, based on a command instructing sewing pattern edit supplied from the sewing machine side regarding a sewing pattern ordered from the sewing machine side. The server applies a patterned it processing to the sewing pattern ordered by the sewing machine side, based on a command which is supplied from the sewing machine side and is indicative of editing the sewing pattern. The command indicative of editing the sewing pattern is indicative of arrangement of one or a plurality of sewing patterns, rotational attitudes, sizes, etc. The pattern edit processing is to synthesize sewing pattern data by setting arrangement of one or a plurality of sewing patterns, rotational attitudes, sizes, etc.

The electronically controlled sewing machine of the present invention which can perform embroidering, characterized in that the sewing machine includes a control unit connectable to a public communication network and that the control unit is provided with a non-volatile memory storing type information indicative of a type of the sewing machine. Since the non-volatile memory is provided for storing the type information indicative of the type of the sewing machine, the type information can automatically be transmitted from the control unit via the public communication unit to an external server or the like. The type information can be transmitted to the server and the like so that the information can be utilized.

The electronically controlled sewing machine of the present invention which can perform embroidering is characterized by a computer provided at the sewing machine side and connected to a public communication network so as to be connectable to a control unit of the sewing machine and in that the computer is provided with a non-volatile memory storing type information indicative of a type of the sewing machine.

The non-volatile memory is provided in the control unit of the sewing machine. The similar non-volatile memory is also provided in the sewing machine side computer connected to the control unit of the sewing machine and further to the public communication network.

The electronically controlled sewing machine of the present invention is characterized in that the non-volatile memory stores identification information capable of specifying the sewing machine. Since the identification information capable of specifying the sewing machine can automatically be transmitted, the sewing machine or the user of the sewing machine can be identified from the identification information.

The sewing pattern supply system of the present invention supplying pattern data of sewing patterns from a server via a public communication network to control units of electronically controlled sewing machines each performing embroidering, is characterized in that each control unit has a non-volatile memory storing type information indicative of a type of the sewing machine, the server has a pattern storage device storing pattern data of a plurality of sewing patterns, and each control unit supplies to the server information indicative of a sewing pattern to be purchased and the type information read from the non-volatile memory when pattern data of the sewing pattern is purchased from the server.

When the user purchases a sewing pattern from the server, the control unit of the sewing machine is connected via the Internet to the server so that information indicative of the sewing pattern to be purchased from the control unit and the type information read from the non-volatile memory are supplied to the server. Consequently, it can be determined whether the ordered sewing pattern is a sewing pattern incorporated in the control unit of the sewing machine and accordingly, a charging system in which sewing patterns other than the incorporated patterns are charged can be employed.

The sewing pattern supply system of the present invention supplying pattern data of sewing patterns from a server via a public communication network to control units of electronically controlled sewing machines each performing embroidering, is characterized in that each control unit has a non-volatile memory storing type information indicative of a type of the sewing machine, the server has a pattern storage device storing pattern data of a plurality of sewing patterns, and each control unit supplies to the server information indicative of a sewing pattern to be purchased and the type information read from the non-volatile memory when pattern data of the sewing pattern is purchased from the server.

The sewing pattern supply system of the present invention is an arrangement in the case where pattern data of sewing pattern is to be purchased into the control unit of the sewing machine from the server via the public communication network. The pattern data of sewing pattern is purchased from the server via the public communication network into the sewing machine side computer connectable to the control unit of the sewing machine.

The sewing pattern supply system of the present invention is characterized in that the non-volatile memory stores identification information capable of specifying the sewing machine. Since the identification information which can specify the sewing machine can automatically be transmitted to the server and the like, the sewing machine or the user of the sewing machine can be specified in the server on the basis of the identification information. For example, when information about sewing patterns the user previously purchased is recorded on the server, the user can be prevented from being re-charged for a sewing pattern the user previously purchased and for which the user paid the fee already.

The sewing pattern supply system of the present invention is characterized in that the server reads pattern data of one or a plurality of sewing patterns ordered at the sewing machine side and applies a pattern edit processing to the ordered sewing patterns, based on the type information transmitted from the sewing machine side and a command indicative of editing the sewing pattern.

When one or a plurality of sewing patterns are ordered from the sewing machine side to the server, the server reads pattern data of the ordered sewing pattern from the pattern storage device. Based on the type information transmitted from the sewing machine side and a command for instructing edit of the sewing pattern, the server applies pattern edit processing to the ordered sewing pattern. The command indicative of editing the sewing pattern is indicative of arrangement of one or a plurality of sewing patterns, rotational attitudes, sizes, etc. The pattern edit processing is to synthesize sewing pattern data by setting arrangement of one or a plurality of sewing patterns, rotational attitudes, sizes, etc. Since the pattern-edit processing is carried out at the server side, the user can confirm the state after the pattern edit processing and formally order the sewing pattern when the result of pattern edit processing is transmitted to the sewing machine side.

The sewing pattern supply system of the present invention is characterized in that the server supplies to the ordering sewing machine side pattern indication data indicative of the sewing pattern to be processed.

The sewing pattern to be processed includes the sewing pattern which is being processed by the pattern edit processing and the sewing pattern which has been processed by the pattern edit processing. Accordingly, since pattern display data displaying the sewing pattern which is being processed by the pattern edit processing and the sewing pattern which has been processed by the pattern edit processing is supplied from the server to the ordering sewing machine side, the data can be displayed on a display of the control unit of the sewing machine side or sewing machine side computer. Accordingly, the user can give an instruction about the sewing pattern edit while viewing the sewing pattern which is being processed by the pattern edit processing and accordingly, the sewing pattern can be edited into a desired state.

The sewing pattern supply system of the present invention is characterized in that the server includes a non-volatile memory storing incorporated pattern information incorporated in the control unit of the sewing machine and classified by a type of the sewing machine.

The server can find the sewing pattern incorporated in the control unit of every type sewing machine, based on a list of incorporated patterns stored in the non-volatile memory. Accordingly, out of the sewing patterns ordered by the user, only the sewing patterns other than the incorporated patterns can be charged for.

The sewing pattern supply system of the present invention is characterized in that the server determines whether the ordered sewing pattern is the incorporated sewing pattern, based on the incorporated pattern information and the type information transmitted from the ordering sewing machine side, thereby supplying, to the sewing machine side, identification display data identifiably displaying whether the ordered sewing pattern is the incorporated sewing pattern, together with the pattern display data.

Based on the incorporated pattern information and the type information, the server determines whether the ordered sewing pattern is the incorporated sewing pattern. The server then supplies, to the sewing machine side, identification display data identifiably displaying whether the ordered sewing pattern is the incorporated sewing pattern, together with the pattern display data. Accordingly, whether the ordered sewing pattern is the incorporated sewing pattern can easily be found from the displayed contents at the sewing machine side. This is convenient in the case where whether the sewing pattern should be ordered formally is determined.

The sewing pattern supply system of the present invention is characterized in that the server includes a non-volatile memory storing area size information indicative of a sewing area size of the sewing machine classified by the type of sewing machine, obtains the sewing area of the ordering sewing machine, based on the area size information and type information supplied by the ordering sewing machine, thereby supplying, to the sewing machine side, sewing area display data displaying the obtained sewing area together with the pattern display data. Since the sewing area display data is supplied from the server to the sewing machine side together with the pattern display data, the user can confirm the sewing pattern and the sewing area from the displayed contents.

The sewing pattern supply system of the present invention is characterized in that the server originates sewing pattern data for sewing the sewing pattern edited by the pattern edit processing, thereby transmitting the sewing pattern data to the sewing machine side. The server originates sewing pattern data for sewing the sewing pattern edited by the pattern edit processing and transmits the processed sewing pattern to the sewing machine side. Accordingly, no sewing pattern data for sewing the sewing pattern edited by the pattern edit processing needs to be originated at the sewing machine side and embroidery sewing can be carried out on the basis of the sewing pattern data transmitted from the server.

The sewing pattern supply server of the present invention which supplies pattern data of sewing pattern via a public communication network to a control unit of an electronically controlled sewing machine or a sewing machine side computer connectable to the control unit is characterized by a pattern storage device storing pattern data of a plurality of sewing patterns, a sewing condition information storage device storing sewing condition information which is indicative of a sewing condition in the sewing machine and is classified by a type of sewing machine, and a pattern edit unit applying a sewing pattern edit processing under a sewing condition according to a type of the sewing machine, based on the sewing machine type information supplied from the sewing machine side and a command indicative of edit of the sewing pattern, regarding a sewing pattern ordered by the sewing machine side.

When receiving an order of sewing pattern from the control unit or sewing machine side computer, the server reads pattern data of the ordered sewing pattern from the pattern storage device and further reads the sewing condition in the ordering sewing machine from the sewing condition information storage device. Based on the sewing machine type information supplied from the sewing machine side and the command to instruct edit of the sewing pattern, the server applies the pattern edit processing for the sewing pattern under the sewing condition according to the sewing machine type by the pattern edit unit regarding the ordered sewing pattern.

The sewing pattern supplying method of supplying pattern data of sewing pattern from a server possessing pattern data of a plurality of sewing patterns via a public communication network to a control unit of an electronically controlled sewing machine which can perform embroidering is characterized by receiving, from the control unit of the sewing machine, type information indicative of a type of the sewing machine, pattern designation information indicative of a desired sewing pattern and a command instructing edit of the sewing pattern, and applying a pattern edit processing according to the type of the ordering sewing machine relative to the received pattern designation information, based on the type information, pattern designation information and edit instruction command in the server.

The server receives, from the control unit of the sewing machine, type information indicative of the type of the sewing machine, pattern designation information indicative of a desired sewing pattern and a command to instruct edit of the sewing pattern. Based on the type information, the pattern designation information and edit instructing command, the server applies pattern edit processing according to the type of the ordering sewing machine to the received pattern designation information. The result of pattern edit processing is to be transmitted to the control unit of the sewing machine side.

The sewing pattern supplying method of the present invention for supplying pattern data of sewing pattern from a server possessing pattern data of a plurality of sewing patterns via a public communication network to a sewing machine side computer connectable to a control unit of an electronically controlled sewing machine which can perform embroidering, is characterized by receiving, from the sewing machine side computer, type information indicative of a type of the sewing machine, pattern designation information indicative of a desired sewing pattern and a command instructing edit of the sewing pattern, and applying a pattern edit processing according to the type of the ordering sewing machine relative to the received pattern designation information, based on the type information, pattern designation information and edit instruction command in the server.

The server receives, from the sewing machine side computer connectable to the control unit of the sewing machine, type information indicative of the type of the sewing machine, pattern designation information indicative of a desired sewing pattern and a command to instruct edit of the sewing pattern. Based on the type information, the pattern designation information and edit instructing command, the server applies pattern edit processing according to the type of the ordering sewing machine to the received pattern designation information. The result of pattern edit processing is to be transmitted to the control unit of the sewing machine side.

The sewing pattern supply program of the present invention provided in a sewing pattern supplying server supplying pattern data of sewing patterns via a public communication network to a control unit of an electronically controlled sewing machine or a sewing machine side computer connectable to the control unit, realizes on a computer of the server the function of storing pattern data of a plurality of sewing patterns, the function of storing sewing condition information which is indicative of a sewing condition in the sewing machine and is classified by a type of sewing machine, and the function of applying a sewing pattern edit processing under a sewing condition according to a type of the sewing machine, based on the sewing machine type information supplied from the sewing machine side and a command indicative of edit of the sewing pattern, regarding a sewing pattern ordered by the sewing machine side.

When the sewing pattern is ordered by the control unit of the sewing machine or the sewing machine side computer connectable to the control unit, a computer of the server reads pattern data of the ordered sewing pattern from stored pattern data of a plurality of sewing patterns and further reads the sewing condition in the ordering sewing machine from the sewing condition information stored by the types, based on the type information supplied from the sewing machine side. Based on the sewing machine type information supplied from the sewing machine side and the command to instruct edit of the sewing pattern, the server applies the pattern edit processing for the sewing pattern under the sewing condition according to the sewing machine type by the pattern edit unit regarding the ordered sewing pattern.

According to the electronically controlled sewing machine of the present invention, the sewing machine control unit is connectable to a public communication network and the control unit is provided with a non-volatile memory storing at least type information indicative of a type of the sewing machine. Accordingly, since the type information can automatically be transmitted from the control unit via the public communication network to the external server or the like, the type information can be transmitted to the server or the like and can be utilized.

According to the electronically controlled sewing machine of the present invention, a computer is provided at the sewing machine side and connected to a public communication network so as to be connectable to a control unit of the sewing machine and in that the computer is provided with a non-volatile memory storing type information indicative of a type of the sewing machine. As compared with the arrangement in which the non-volatile memory is provided on the control unit of the sewing machine, the similar non-volatile memory as described above is provided in the sewing machine side computer connected to the control unit of the sewing machine and further to the public communication network.

According to the electronically controlled sewing machine of the present invention, the non-volatile memory stores identification information capable of specifying the sewing machine. Since the identification information can automatically be transmitted to the server or the like, the sewing machine or the user of the sewing machine can be identified in the server or the like on the basis of the identification information.

According to the sewing pattern supply system of the present invention, each control unit has a non-volatile memory storing type information indicative of a type of the sewing machine. The server has a pattern storage device storing pattern data of a plurality of sewing patterns. Each control unit supplies to the server information indicative of a sewing pattern to be purchased and the type information read from the non-volatile memory when pattern data of the sewing pattern is purchased from the server. Accordingly, whether the ordered sewing pattern is the pattern incorporated in the control unit of the sewing machine can be determined and accordingly, out of the sewing patterns ordered by the user, only the sewing patterns other than the incorporated patterns can be charged for.

According to the sewing pattern supply system of the present invention, as compared with the case where pattern data of a sewing pattern is purchased from the server via the public communication network into the control unit of the sewing machine, pattern data of a sewing pattern is purchased from the server via the public communication network into the sewing machine side computer connectable to the control unit of the sewing machine.

According to the sewing pattern supply system of the present invention, the non-volatile memory stores identification information capable of specifying the sewing machine. Since identification information capable of specifying the sewing machine can automatically be transmitted to the server or the like, the server or the like can specify the sewing machine or the user of the sewing machine on the basis of the identification information. For example, when information about sewing patterns the user previously purchased is recorded on the server, the user can be prevented from being re-charged for a sewing pattern the user previously purchased and for which the user paid the fee already.

According to the sewing pattern supply system of the present invention, the server reads pattern data of one or a plurality of sewing patterns ordered at the sewing machine side and applies a pattern edit processing to the ordered sewing patterns, based on the type information transmitted from the sewing machine side and a command indicative of editing the sewing pattern. Thus, since the pattern edit processing is carried out at the server side, the user can confirm the state after the pattern edit processing and formally order the sewing pattern when the result of pattern edit processing is transmitted to the sewing machine side.

According to the sewing pattern supply system of the present invention, the server supplies to the ordering sewing machine side pattern indication data indicative of the sewing pattern to be processed. Accordingly, since pattern display data displaying the sewing pattern which is being processed by the pattern edit processing and the sewing pattern which has been processed by the pattern edit processing is supplied from the server to the ordering sewing machine side, the data can be displayed on a display of the control unit of the sewing machine side or sewing machine side computer. Accordingly, the user can give an instruction about the sewing pattern edit while viewing the sewing pattern which is being processed by the pattern edit processing and accordingly, the sewing pattern can be edited into a desired state.

According to the sewing pattern supply system of the present invention, the server includes a non-volatile memory storing incorporated pattern information incorporated in the control unit of the sewing machine and classified by a type of the sewing machine. Accordingly, out of the sewing patterns ordered by the user, only the sewing patterns other than the incorporated patterns can be charged for.

According to the sewing pattern supply system of the present invention, the server determines whether the ordered sewing pattern is the incorporated sewing pattern, based on the incorporated pattern information and the type information transmitted from the ordering sewing machine side, thereby supplying, to the sewing machine side, identification display data identifiably displaying whether the ordered sewing pattern is the incorporated sewing pattern, together with the pattern display data. Accordingly, whether the ordered sewing pattern is the incorporated sewing pattern can easily be found from the displayed contents at the sewing machine side. This is convenient in the case where whether the sewing pattern should be ordered formally is determined.

According to the sewing pattern supply system of the present invention, the server obtains the sewing area of the ordering sewing machine, based on the area size information and type information supplied by the ordering sewing machine, thereby supplying, to the sewing machine side, sewing area display data displaying the obtained sewing area together with the pattern display data. Accordingly, the user can confirm the sewing pattern and the sewing area from the displayed contents.

According to the sewing pattern supply system of the present invention, the server originates sewing pattern data for sewing the sewing pattern edited by the pattern edit processing, thereby transmitting the sewing pattern data to the sewing machine side. Accordingly, no sewing pattern data for sewing the sewing pattern edited by the pattern edit processing needs to be originated at the sewing machine side and embroidery sewing can be carried out on the basis of the sewing pattern data transmitted from the server.

According to the sewing pattern supply server of the present invention, when receiving an order of sewing pattern from the control unit or sewing machine side computer, the server reads pattern data of the ordered sewing pattern from the pattern storage device and further reads the sewing condition in the ordering sewing machine from the sewing condition information storage device. Based on the sewing machine type information supplied from the sewing machine side and the command to instruct edit of the sewing pattern, the server applies the pattern edit processing for the sewing pattern under the sewing condition according to the sewing machine type by the pattern edit unit regarding the ordered sewing pattern.

According to the sewing pattern supplying method of the present invention, the server receives, from the control unit of the sewing machine, type information indicative of the type of the sewing machine, pattern designation information indicative of a desired sewing pattern and a command to instruct edit of the sewing pattern. Based on the type information, the pattern designation information and edit instructing command, the server applies pattern edit processing according to the type of the ordering sewing machine to the received pattern designation information.

According to the sewing pattern supply program of the present invention, when the sewing pattern is ordered by the control unit of the sewing machine or the sewing machine side computer connectable to the control unit, a computer of the server reads pattern data of the ordered sewing pattern from stored pattern data of a plurality of sewing patterns and further reads the sewing condition in the ordering sewing machine from the sewing condition information stored by the types, based on the type information supplied from the sewing machine side. Based on the sewing machine type information supplied from the sewing machine side and the command to instruct edit of the sewing pattern, the server can apply the pattern edit processing for the sewing pattern under the sewing condition according to the sewing machine type by the pattern edit unit regarding the ordered sewing pattern.

The foregoing description and drawings are merely illustrative of the principles of the present invention and are not construed in a limiting sense. Various changes and modifications will become apparent to those of ordinary skill in the art. All such changes and modifications are seen to fall within the scope of the invention as defined by the appended claims.

INDUSTRIAL APPLICABILITY

The control unit reads type information from a non-volatile memory and transmits the type information to a server when purchasing pattern data of a sewing pattern from the server. Based on the type information, the server determines whether the ordered sewing pattern is a sewing pattern incorporated in the control unit of an ordering sewing machine, transmitting a result of determination to the control unit. Consequently, the control unit can reliably avoid ordering a sewing pattern incorporated therein.

I claim:

1. A sewing pattern supply system supplying pattern data of sewing patterns from a server via a public communication network to control units of a plurality of electronically controlled sewing machines capable of sewing a plurality of embroidery patterns, wherein:

each control unit has a non-volatile memory storing type information indicative of a type of the sewing machine;

the server has a pattern storage device storing pattern data of a plurality of sewing patterns;

each control unit transmits to the server the type information read from the non-volatile memory when pattern data of a sewing pattern is purchased; and the server determines whether an ordered sewing pattern is a sewing pattern incorporated in the control unit of an ordering sewing machine, based on the type information, thereby transmitting a result of determination to the control unit.

2. A sewing pattern supply system supplying pattern data of sewing patterns from a server via a public communication network to a sewing machine side computer connectable to control units of a plurality of electronically controlled sewing machines capable of sewing a plurality of embroidery patterns, respectively, wherein:

the computer has a non-volatile memory storing type information indicative of a type of the sewing machine;

the server has a pattern storage device storing pattern data of a plurality of sewing patterns;

the computer transmits to the server the type information read from the non-volatile memory when pattern data of a sewing pattern is purchased; and the server determines whether an ordered sewing pattern is a sewing pattern incorporated in the computer of an ordering sewing machine side, based on the type information, thereby transmitting a result of determination to the computer of the sewing machine side.

3. A sewing pattern supply system according to claim 1, wherein:

the server has an incorporated pattern information storage device storing incorporated pattern information indicative of incorporated sewing patterns incorporated in the control unit of the sewing machine or the sewing machine side computer connectable to the control unit; and the server has a pattern determining unit determining whether the ordered sewing pattern is the incorporated sewing pattern, based on the incorporated pattern information incorporated in the incorporated pattern storing device and the type information supplied from the ordering sewing machine side.

4. A sewing pattern supply system according to claim 3, wherein the server obtains a charge for the sewing pattern determined not to be an incorporated sewing pattern by the pattern determining unit out of the ordered sewing patterns, thereby transmitting the charge to the sewing machine side.

5. A sewing pattern supply system according to claim 4, wherein the server charges a payer designated by the ordering sewing machine side with the obtained charge.

6. A sewing pattern supply system according to claim 3, wherein the server has user registration information which is transmitted from the sewing machine side and is capable of identifying a user and a user information storage device storing a purchased pattern list of sewing patterns the user previously purchased.

7. A sewing pattern supply system according to claim 6, wherein the server obtains a charge for a newly purchased sewing pattern not contained in the purchased pattern list out of sewing patterns not incorporated in the control unit of the ordering sewing machine further out of the ordered sewing patterns, thereby transmitting the charge to the sewing machine side.

8. A sewing pattern supply system according to claim 7, wherein the server charges a payer designated by the ordering sewing machine side with the obtained charge.

9. A sewing pattern supply server supplying pattern data of sewing patterns via a public communication network to a sewing machine side computer connectable to control units of a plurality of electronically controlled sewing machines each capable of sewing a plurality of embroidery patterns, wherein:

a pattern storage device stores pattern data of a plurality of sewing patterns;

an incorporated pattern information storage device stores incorporated pattern information referring to incorporated sewing patterns incorporated in the control units of a plurality of sewing machines; and a determines unit determining whether a sewing pattern ordered at the sewing machine side is the incorporated sewing pattern incorporated in a control unit or computer of the ordering sewing machine.

10. A sewing pattern supply server according to claim 9, further comprising a pattern edit processing unit applying a pattern edit processing to the sewing pattern ordered by the sewing machine side, based on a command which is supplied from the sewing machine side and is indicative of editing the sewing pattern.

11. A sewing pattern supply program provided in a sewing pattern supplying server supplying pattern data of sewing patterns via a public communication network to a sewing machine side computer connectable to control units of a plurality of electronically controlled sewing machines each capable of sewing a plurality of embroidery patterns, the program realizing on the computer of a server:

a function of storing pattern data of a plurality of sewing patterns;

a function of storing incorporated pattern information referring to incorporated sewing patterns incorporated in the control units of a plurality of sewing machines; and a function of determining whether a sewing pattern ordered at the sewing machine side is an incorporated sewing pattern incorporated in the control unit or computer of the ordering sewing machine.

12. A sewing pattern supply program according to claim 11, further realizing the function of applying a pattern edit processing to the sewing pattern ordered by the sewing machine side, based on a command which is supplied from the sewing machine side and is indicative of editing the sewing pattern.

13. An electronically controlled sewing machine which can perform embroidering, comprising a control unit provided with a non-volatile memory storing at least type information indicative of a type of the sewing machine, the type corresponding to a sewing area in which an embroidery pattern can be sewn, the control unit being connectable via a public communication network to an embroidery pattern supply server so that the type information is transmitted to the server, the type information being provided for determining the sewing area previously set in the type of sewing machine, at the embroidery pattern supply server side.

14. An electronically controlled sewing machine which can perform embroidering, comprising a control unit and a computer connected to the control unit and provided with a non-volatile memory storing at least type information indicative of a type of the sewing machine, the type corresponding to a sewing area in which an embroidery pattern can be sewn, the computer being connectable via a public communication network to an embroidery pattern supply server so that the type information is transmitted to the server, the type information being provided for determining the sewing area previously set in the type of sewing machine, at the embroidery pattern supply server side.

15. An electronically controlled sewing machine according to claim 13, wherein the non-volatile memory stores identification information capable of specifying the sewing machine.

16. A sewing pattern supply system supplying pattern data of sewing patterns from a server via a public communication network to control units of electronically controlled sewing machines each performing embroidering, wherein:
   each control unit has a non-volatile memory storing type information indicative of a type of the sewing machine;
   the server has a pattern storage device storing pattern data of a plurality of sewing patterns; and
   each control unit supplies to the server information indicative of a sewing pattern to be purchased and the type information read from the non-volatile memory when pattern data of the sewing pattern is purchased from the server.

17. A sewing pattern supply system according to claim 16, wherein the non-volatile memory stores identification information capable of specifying the sewing machine.

18. A sewing pattern supply system according to claim 17, wherein the server reads pattern data of one or a plurality of sewing patterns ordered at the sewing machine side and applies a pattern edit processing to the ordered sewing patterns, based on the type information transmitted from the sewing machine side and a command indicative of editing the sewing pattern.

19. A sewing pattern supply system according to claim 18, wherein the server supplies to the ordering sewing machine side pattern indication data indicative of the sewing pattern to be processed.

20. A sewing pattern supply system according to claim 19, wherein the server includes a non-volatile memory storing incorporated pattern information incorporated in the control unit of the sewing machine and classified by a type of the sewing machine.

21. A sewing pattern supply system according to claim 20, wherein the server determines whether the ordered sewing pattern is the incorporated sewing pattern, based on the incorporated pattern information and the type information transmitted from the ordering sewing machine side, thereby supplying, to the sewing machine side, identification display data identifiably displaying whether the ordered sewing pattern is the incorporated sewing pattern, together with the pattern display data.

22. A sewing pattern supply system according to claim 21, wherein the server includes a non-volatile memory storing area size information indicative of a sewing area size of the sewing machine classified by the type of the sewing machine, obtains the sewing area of the ordering sewing machine, based on the area size information and type information supplied by the ordering sewing machine, thereby supplying, to the sewing machine side, sewing area display data displaying the obtained sewing area together with the pattern display data.

23. A sewing pattern supply system according to claim 18, wherein the server originates sewing pattern data for sewing the sewing pattern edited by the pattern edit processing, thereby transmitting the sewing pattern data to the sewing machine side.

24. A sewing pattern supply system supplying pattern data of sewing patterns from a server via a public communication network to a sewing machine side computer connectable to a control unit of an electronically controlled sewing machine performing embroidering, wherein:
   the computer has a non-volatile memory storing type information indicative of a type of the sewing machine;
   the server has a pattern storage device storing pattern data of a plurality of sewing patterns; and
   the computer supplies, to the server, information indicative of a sewing pattern to be purchased and the type information read from the non-volatile memory when the pattern data of sewing pattern is purchased from the server.

25. A sewing pattern supply server which supplies pattern data of sewing pattern via a public communication network to a control unit of an electronically controlled sewing machine or a sewing machine side computer connectable to the control unit, comprising:
   a pattern storage device storing pattern data of a plurality of sewing patterns;
   a sewing condition information storage device storing sewing condition information which is indicative of a sewing condition in the sewing machine and is classified by a type of the sewing machine; and
   a pattern edit unit applying a sewing pattern edit processing under a sewing condition according to a type of a sewing machine, based on the sewing machine type information supplied from the sewing machine side and a command indicative of edit of the sewing pattern, regarding a sewing pattern ordered by the sewing machine side.

26. A sewing pattern supplying method of supplying pattern data of sewing pattern from a server possessing pattern data of a plurality of sewing patterns via a public communication network to a control unit of an electronically controlled sewing machine which can perform embroidering, comprising:
   receiving, from the control unit of the sewing machine, type information indicative of a type of a sewing machine, pattern designation information indicative of a desired sewing pattern and a command instructing edit of the sewing pattern; and applying a pattern edit processing according to the type of the ordering sewing machine relative to the received pattern designation information, based on the type information, pattern designation information and edit instruction command in the server.

27. A sewing pattern supplying method of supplying pattern data of sewing pattern from a server possessing pattern data of a plurality of sewing patterns via a public communication network to a sewing machine side computer connectable to a control unit of an electronically controlled sewing machine which can perform embroidering, comprising:

receiving, from the sewing machine side computer, type information indicative of a type of the sewing machine, pattern designation information indicative of a desired sewing pattern and a command instructing edit of the sewing pattern; and applying a pattern edit processing according to the type of the ordering sewing machine relative to the received pattern designation information, based on the type information, pattern designation information and an edit instruction command in the server.

28. A sewing pattern supply program provided in a sewing pattern supplying server supplying pattern data of sewing patterns via a public communication network to a control unit of an electronically controlled sewing machine or a sewing machine side computer connectable to the control unit, the program realizing on a computer of the server:

a function of storing pattern data of a plurality of sewing patterns;

a function of storing sewing condition information which is indicative of a sewing condition in the sewing machine and is classified by a type of sewing machine; and a function of applying a sewing pattern edit processing under a sewing condition according to a type of the sewing machine, based on the sewing machine type information supplied from the sewing machine side and a command indicative of edit of the sewing pattern, regarding a sewing pattern ordered by the sewing machine side.

* * * * *